(12) United States Patent
Otsubo et al.

(10) Patent No.: US 6,411,008 B1
(45) Date of Patent: Jun. 25, 2002

(54) DRIVE DEVICE FOR VIBRATION TYPE MOTOR AND IMAGE FORMING APPARATUS

(75) Inventors: Toshihiko Otsubo, Numazu; Tetsuro Fukusaka, Susono, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,625

(22) Filed: Sep. 9, 1999

(30) Foreign Application Priority Data

Sep. 11, 1919 (JP) .......................................... 10-258533
Dec. 15, 1998 (JP) .......................................... 10-355880

(51) Int. Cl.[7] ................................................ H02N 2/00
(52) U.S. Cl. .................................. 310/316.01; 310/317
(58) Field of Search ....................... 310/316.01, 316.02, 310/317

(56) References Cited

U.S. PATENT DOCUMENTS 5,173,631 A * 12/1992 Suganuma ............. 310/316.01
5,214,339 A * 5/1993 Naito ..................... 310/316.01
5,508,579 A * 4/1996 Suganuma ............. 310/316.01
6,147,434 A * 11/2000 Nakano et al. ............. 310/317

FOREIGN PATENT DOCUMENTS

| JP | 58-148682 | 9/1983 | .......... H02N/11/00 |
| JP | 59-204477 | 11/1984 | .......... H02N/11/00 |
| JP | 60-176470 | 9/1985 | ............ H02N/2/00 |
| JP | 63-1379 | 1/1988 | ............ H02N/2/00 |

* cited by examiner

Primary Examiner—Thomas M. Dougherty
(74) Attorney, Agent, or Firm—Fitzpatrick, Cella, Harper & Scinto

(57) ABSTRACT

This invention relates to a driving control device for a vibration wave motor. A periodic change in frequency of a driving periodic signal is detected during driving of the motor, a frequency corresponding to the detected change is set as a lower limit value, and the driving frequency is controlled not to drop below the lower limit value, thereby preventing the motor from abruptly stopping due to a motor load drift.

14 Claims, 29 Drawing Sheets

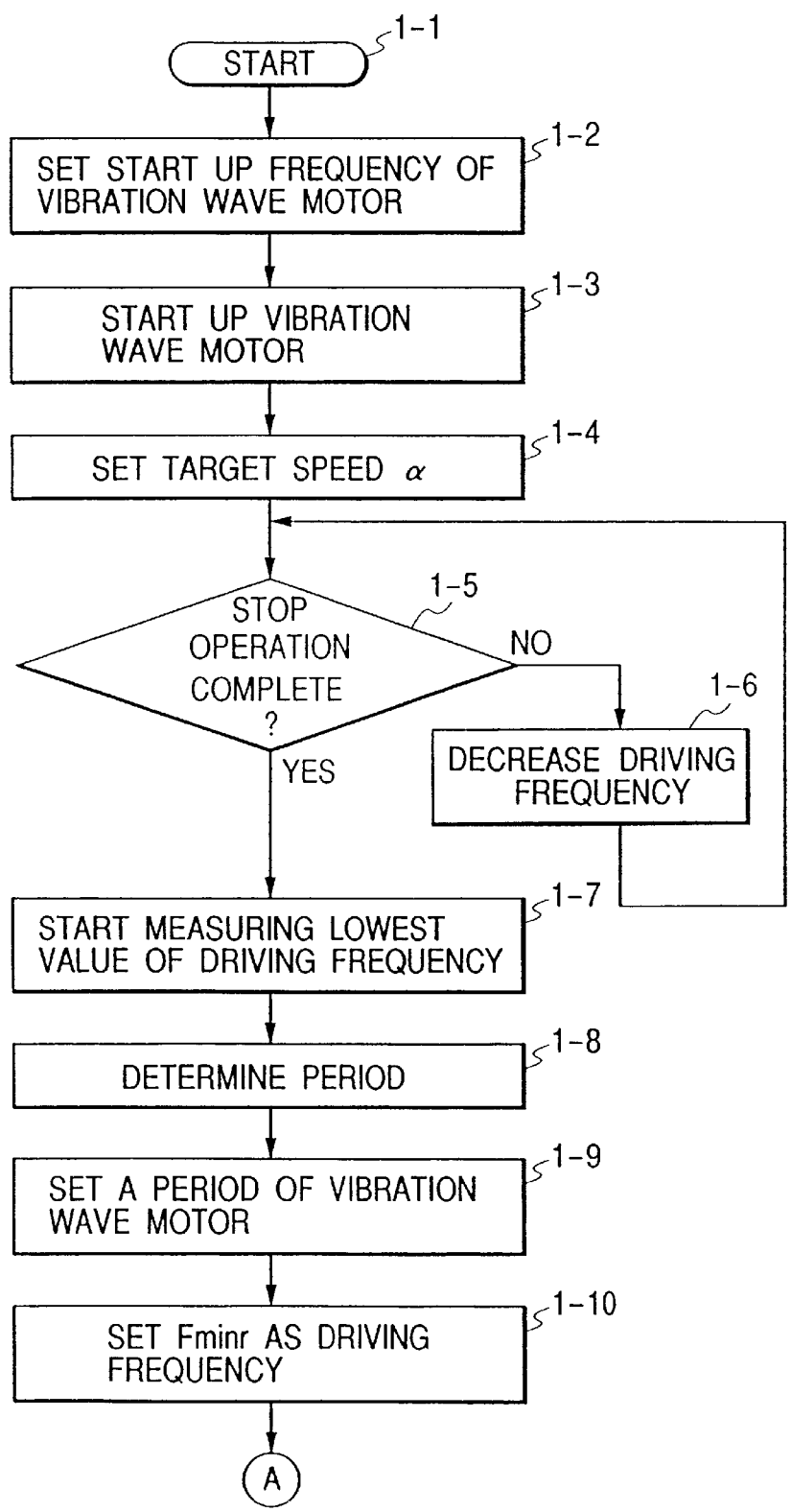

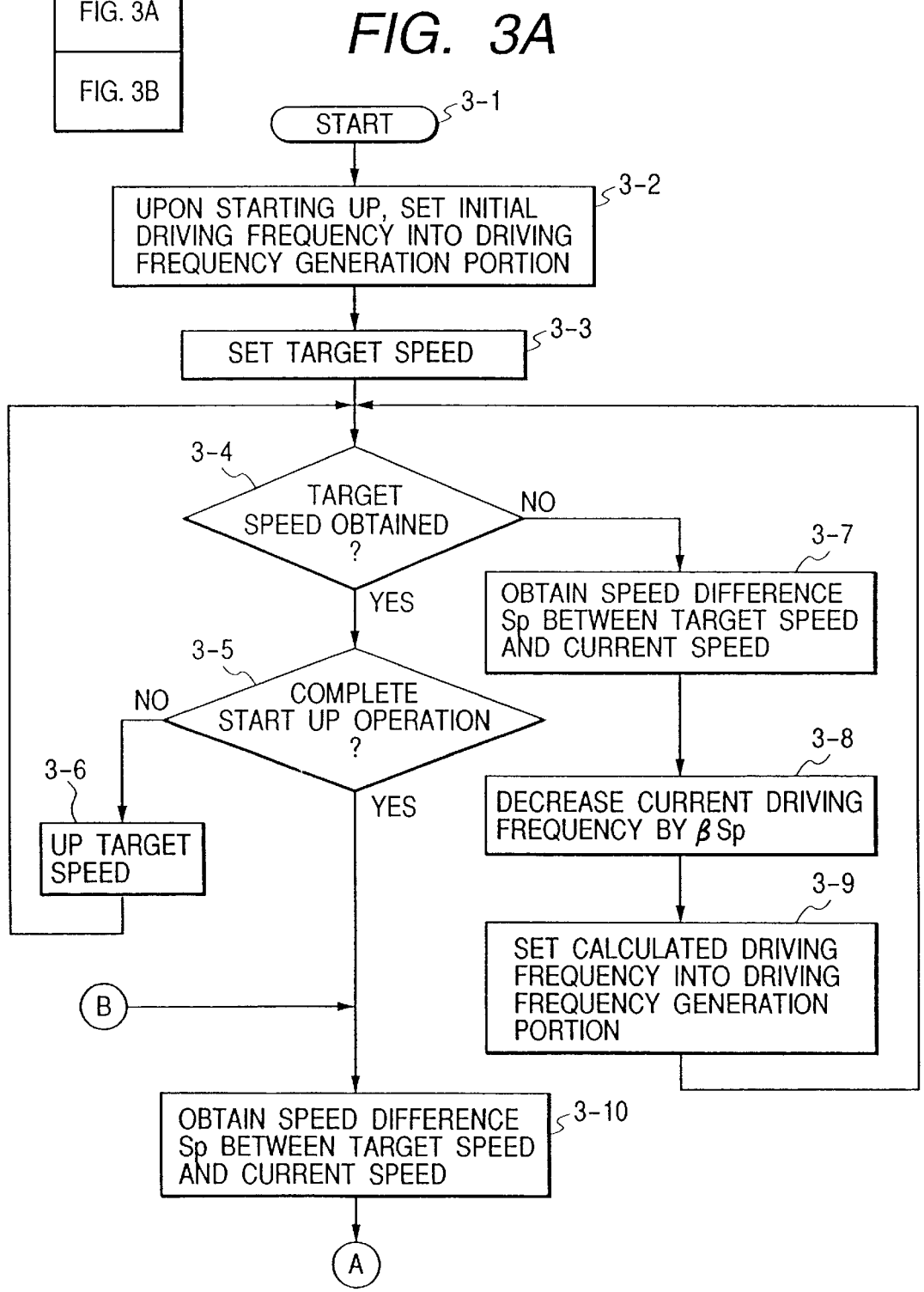

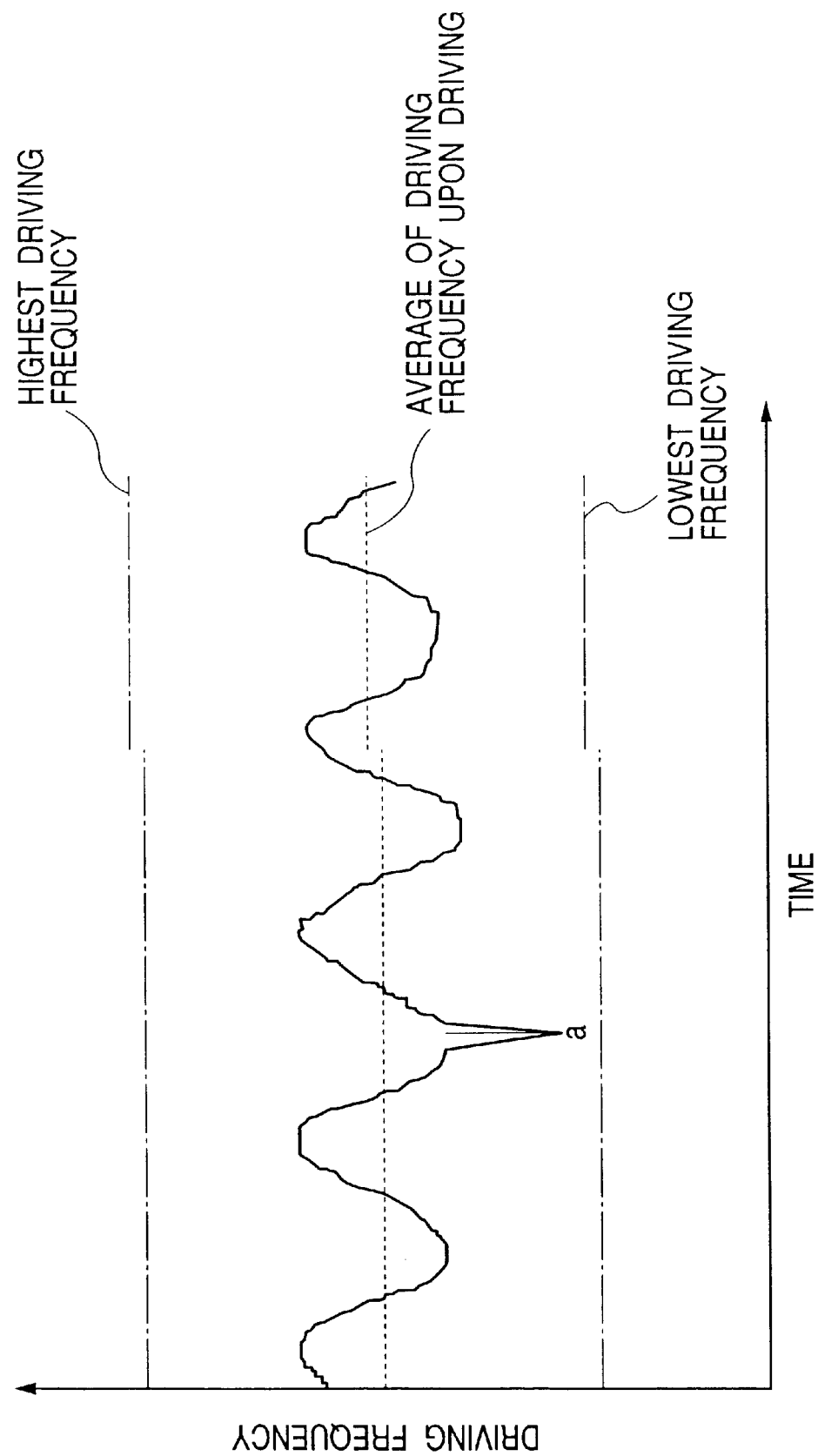

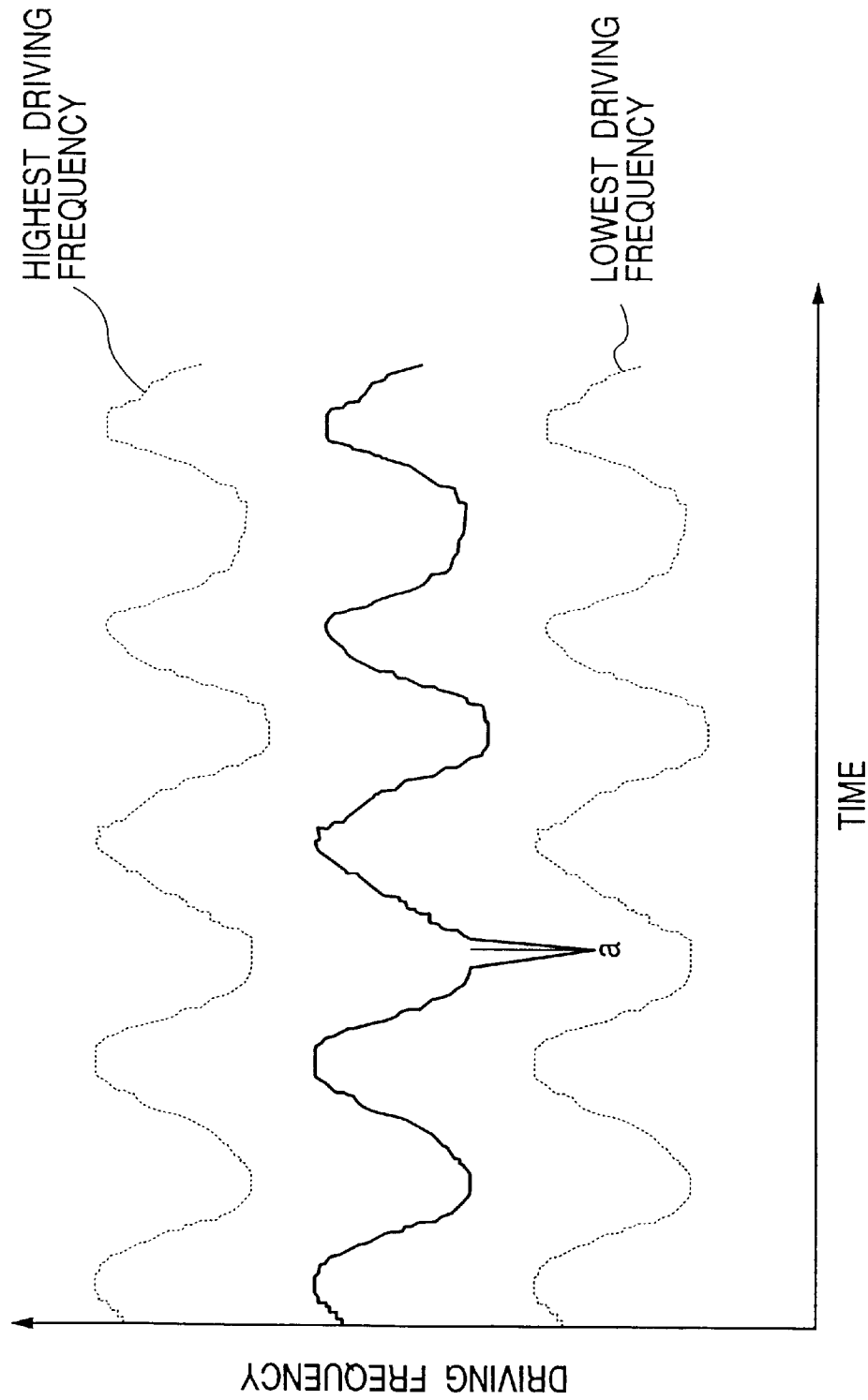

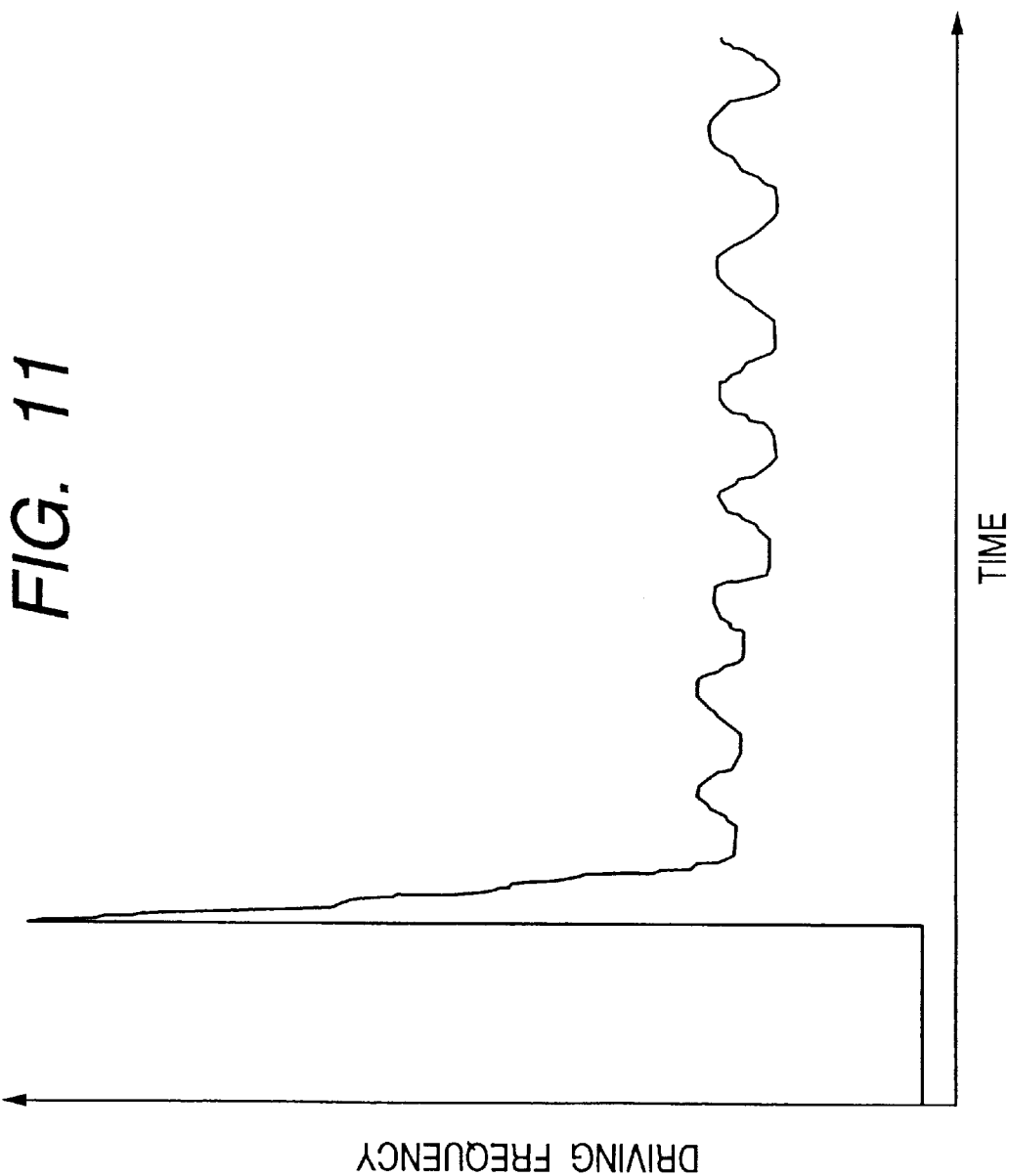

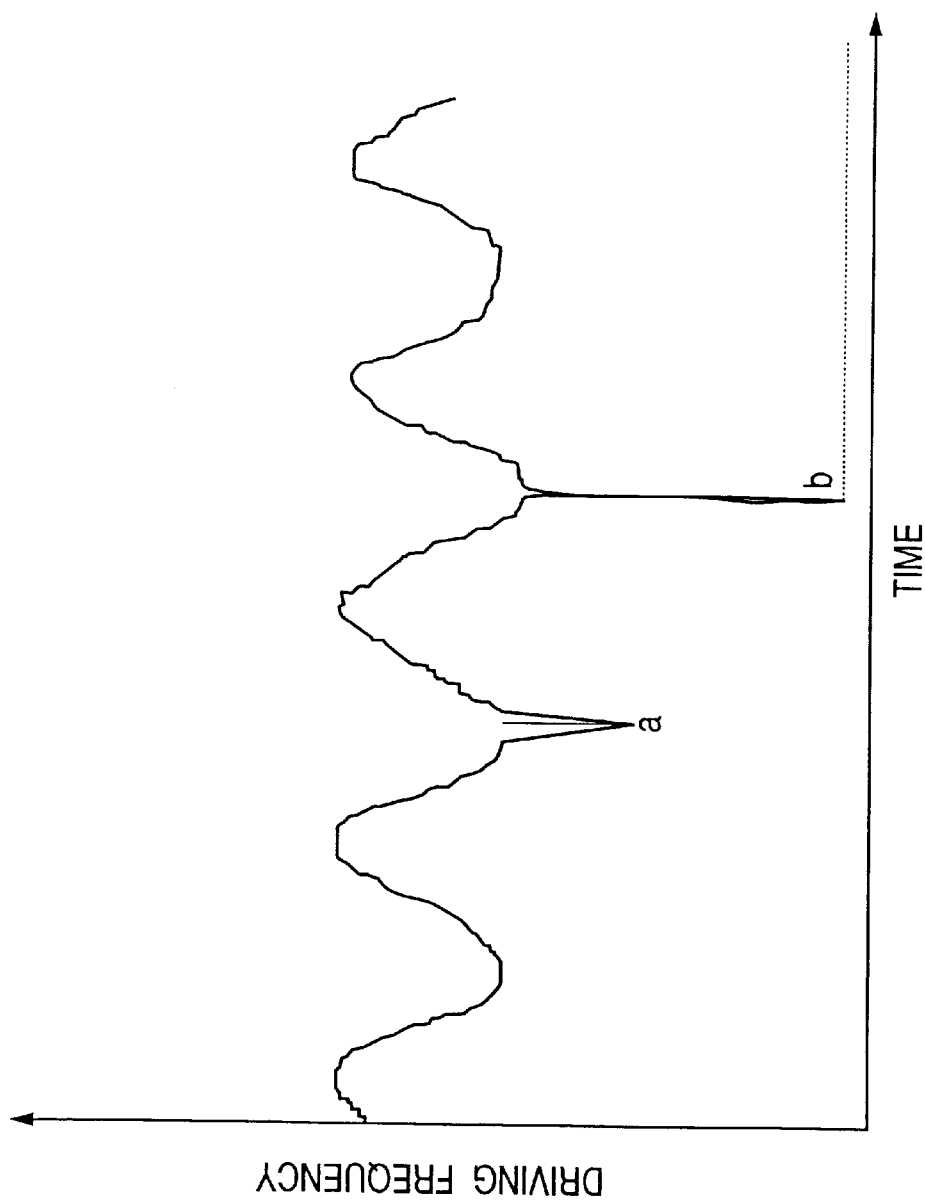

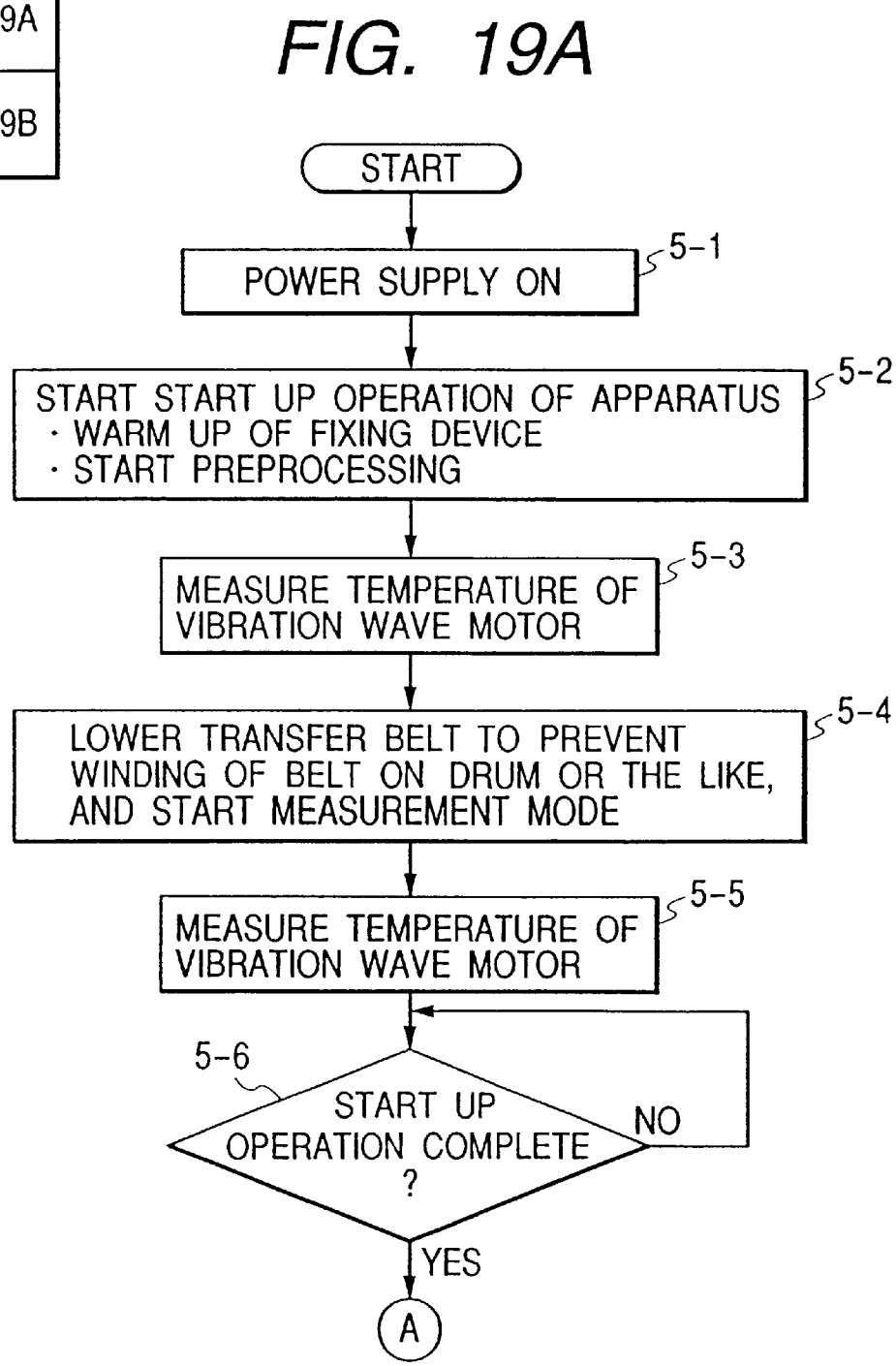

FIG. 21

| EXAMPLE | TEMPERATURE AT START OF MEASUREMENT | LOWEST FREQUENCY | TEMPERATURE AT END OF MEASUREMENT |
|---|---|---|---|
| 15 °C | T11<br>T12<br>T13<br>T14<br>T15 | Fs11<br>Fs12<br>Fs13<br>Fs14<br>Fs15 | T21<br>T22<br>T23<br>T24<br>T25 |
| 25 °C | T31<br>T32<br>T33<br>T34<br>T35 | Fs21<br>Fs22<br>Fs23<br>Fs24<br>Fs25 | T41<br>T42<br>T43<br>T44<br>T45 |
| 35 °C | T31'<br>T32'<br>T33'<br>T34'<br>T35' | Fs21'<br>Fs22'<br>Fs23'<br>Fs24'<br>Fs25' | T41'<br>T42'<br>T43'<br>T44'<br>T45' |
| 45 °C | T31"<br>T32"<br>T33"<br>T34"<br>T35" | Ts21"<br>Ts22"<br>Ts23"<br>Ts24"<br>Ts25" | T41"<br>T42"<br>T43"<br>T44"<br>T45" |
| 55 °C | ⋮ | ⋮ | ⋮ |

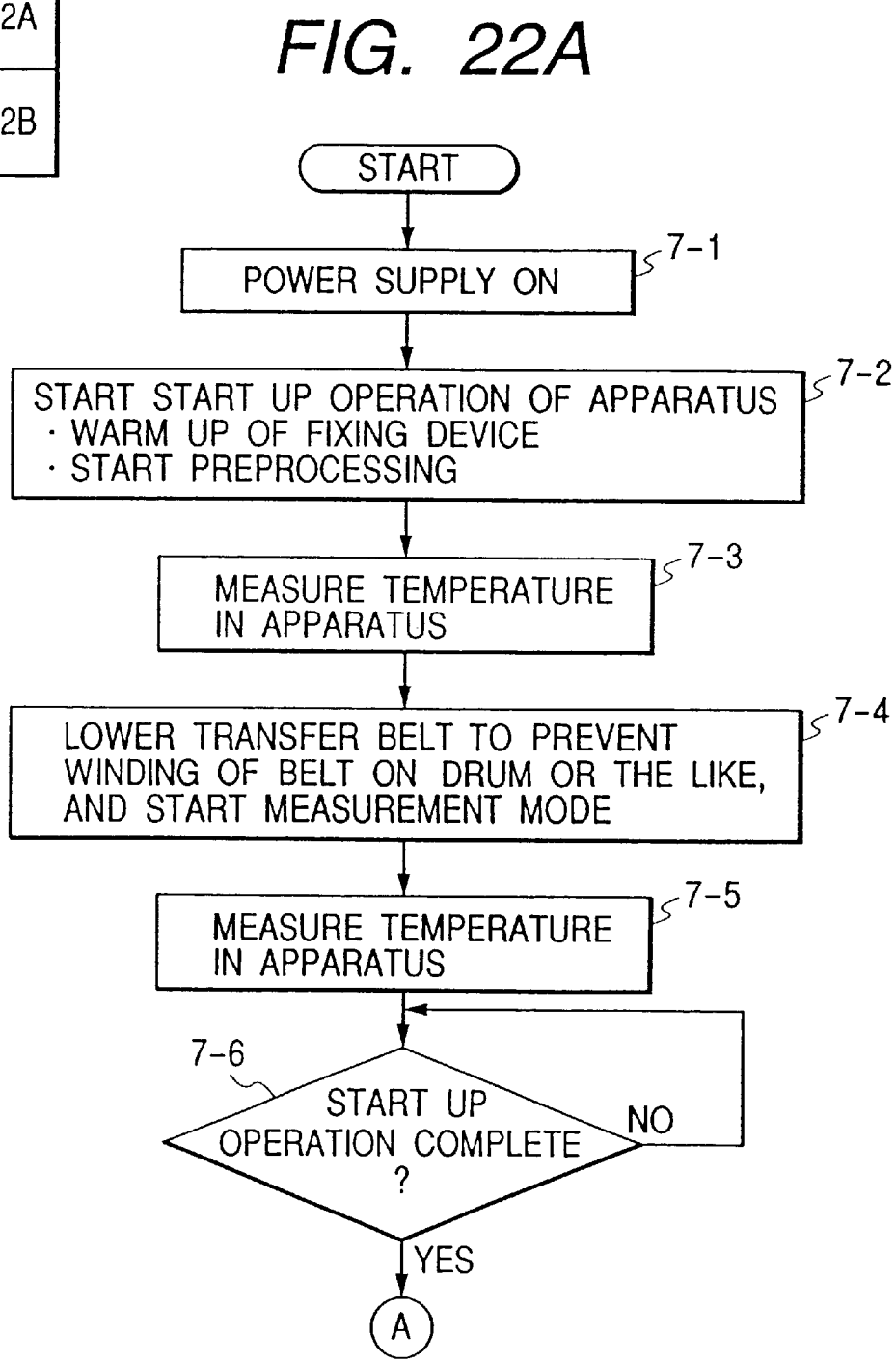

FIG. 24

| TEMPERATURE AT START OF MEASUREMENT | LOWEST FREQUENCY | TEMPERATURE AT END OF MEASUREMENT |
|---|---|---|
| Ta1 | Fs11<br>Fs12<br>Fs13<br>Fs14<br>Fs15 | Ta2 |
| Ta3 | Fs21<br>Fs22<br>Fs23<br>Fs24<br>Fs25 | Ta4 |
| Ta3' | Fs21'<br>Fs22'<br>Fs23'<br>Fs24'<br>Fs25' | Ta4' |
| Ta3" | Ts21"<br>Ts22"<br>Ts23"<br>Ts24"<br>Ts25" | Ta4" |
| ⋮ | ⋮ | ⋮ |

DRIVE DEVICE FOR VIBRATION TYPE MOTOR AND IMAGE FORMING APPARATUS

BACKGROUND OF THE INVENTION

1. Field of the Invention

The present invention relates to a drive device for a vibration type motor and an image forming apparatus and, more particularly, to a device which is suitably applied to an electrophotography apparatus such as a printer apparatus, copying machine, facsimile apparatus, and the like, which rotate rotary members such as a photosensitive drum, transfer belt, transfer drum, and the like using a vibration type (vibration wave) motor as a drive means with high rotational precision.

2. Related Background Art

A vibration type motor (e.g., a vibration wave motor) normally excites a plurality of vibrations in a vibration member using frequency beyond the audible range, and obtains a driving force by synthesizing these vibrations, as proposed in Japanese Patent Application Laid-Open No. 58-148682, and as for its driving performance, stable rotation performance at constant speed is realized, as described in detail in Japanese Patent Application Laid-Open Nos. 63-1379, 60-176470, 59-204477, and the like.

In the prior art, in an electrophotography apparatus which rotates a photosensitive drum and transfer belt using a vibration wave motor as a drive means with high rotational precision, when a recording paper sheet enters the transfer belt or a paper sheet on the transfer belt enters a fixing device, an abrupt load drift occurs.

At this time, in the case of a vibration wave motor having a normal speed control, when the load in the vibration wave motor increases abruptly, since the vibration wave motor increases its torque in correspondence with the load, the driving frequency to be supplied to the vibration wave motor is controlled so as to abruptly decrease. As a result, the vibration wave motor reaches a range wherein it cannot operate, and stops.

FIG. 11 shows this state. The abscissa plots time, whereas the ordinate plots the driving frequency. FIG. 11 indicates a case wherein the motor reaches a stable speed state from the beginning of its driving. As shown in FIG. 11, the driving frequency drifts up and down at given cycles, but such drifts are caused by the inertia of the load, and the like. Hence, various cases occur depending on the load.

When such a vibration wave motor is used as drive means for driving a photosensitive drum or for driving an endless transfer medium conveyor belt for conveying a transfer medium in a color electrophotography apparatus (in which photosensitive drums of the respective colors are lined up along the convey direction of a transfer medium), and when a transfer medium such as a recording paper sheet becomes attached to the transfer medium conveyor belt or enters a fixing device for fixing a toner image on the transfer medium by heat and pressure while the vibration wave motor is driven in a steady state, as shown in FIG. 12, an abrupt load drift occurs. Hence, the driving frequency changes abruptly depending on the control response characteristics, as indicated by peak "a" in FIG. 12.

Furthermore, when the load is heavy, peak "b" appears, and the driving frequency decreases to a range where the vibration wave motor can no longer rotate.

For this reason, when the motor temporarily comes to a halt, the driving frequency must be returned to an initial startup frequency again to restart the motor, thus requiring special processes. Hence, normal control cannot restart the motor.

The range where the vibration wave motor cannot operate corresponds to a portion where the motor can no longer rotate when the driving frequency decreases, and is called a resonance frequency fc of the vibration wave motor, as shown in FIGS. 13A and 13B. As is known, since the resonance frequency fc varies in units of vibration wave motors, and also varies depending on the motor temperature, if the lower limit value of the driving frequency is set to be a small value to inhibit the driving frequency from dropping below this lower limit value, the resonance frequency itself may assume a value larger than the lower limit value. For this reason, a small lower limit value cannot be set. When a large lower limit value is set, the aforementioned problem can be solved, but a value smaller than this lower limit value may be exhibited due to normal frequency drift (e.g., a slight load drift or frequency drift in constant speed control) in a normal driving state, and the frequency drift range, which should be allowed, is limited.

SUMMARY OF THE INVENTION

It is an object of the present invention to provide a drive device for a vibration type motor, which guarantees stable driving by reducing the possibility of the motor coming to a stop even when the driving frequency has varied due to a load drift.

One aspect of the invention is to provide a drive device for a vibration type motor which obtains a driving force by applying a periodic signal to an electro-mechanical energy conversion element portion provided with a vibration member, comprising limit value setting means for setting a lower limit value of a driving frequency, which is determined in accordance with a change in frequency of the periodic signal while the motor is being driven, and inhibition means for inhibiting the frequency of the periodic signal from shifting in a direction to become lower than the lower limit value set by the limit value setting means during driving of the motor.

One aspect of the invention is to provide an image forming apparatus, which has one or a plurality of image carriers, exposure means for forming a latent image by irradiating each of the image carriers with image light, development means for developing the latent image with toner, convey means for conveying a transfer medium toward a transfer position, and transferring a toner image carried on each of the image carriers onto the transfer medium, and one or a plurality of vibration type motors each of which obtains a driving force by applying a periodic signal to an electro-mechanical energy conversion element portion provided with a vibration member, and uses the vibration type motors as drive sources for the one or the plurality of image carriers and the convey means, comprising limit value setting means for setting a lower limit value of a driving frequency, which is determined in accordance with a change in frequency of the periodic signal while the motor is being driven, and inhibition means for inhibiting the frequency of the periodic signal from shifting in a direction to become lower than the lower limit value set by the limit value setting means during driving of the motor.

One aspect of the invention is to provide a drive device for a vibration wave motor, which controls driving by applying a driving periodic signal to the vibration wave motor, having a measurement mode for detecting the temperature of the vibration wave motor and the characteristic value of the driving periodic signal, wherein a critical frequency is set on the basis of the characteristic value and temperature upon operating the motor measured in this mode.

Other objects of the present invention will become apparent from the following description of the embodiments taken in conjunction with the accompanying drawings.

BRIEF DESCRIPTION OF THE DRAWINGS

FIGS. 1A, 1B and 1C are flow charts showing the operation according to the first embodiment of the present invention;

FIG. 9 is a graph showing the relationship between the driving frequency fluctuation, and the highest and lowest driving frequencies in the third embodiment;

FIG. 10 is a graph showing the relationship between the driving frequency fluctuation, and the highest and lowest driving frequencies in the third embodiment when the number of samples to be averaged is reduced;

FIG. 11 is a graph showing the driving frequency fluctuation of a vibration wave motor;

FIG. 12 is a partially enlarged graph of FIG. 11;

FIG. 21 shows a table in the fifth embodiment;

FIG. 24 is shows a table in the sixth embodiment.

DESCRIPTION OF THE PREFERRED EMBODIMENTS

First Embodiment

FIGS. 1A to 1C , 2, 3A, 3B, 4 and 5 show the first embodiment of the present invention.

Figure 4:
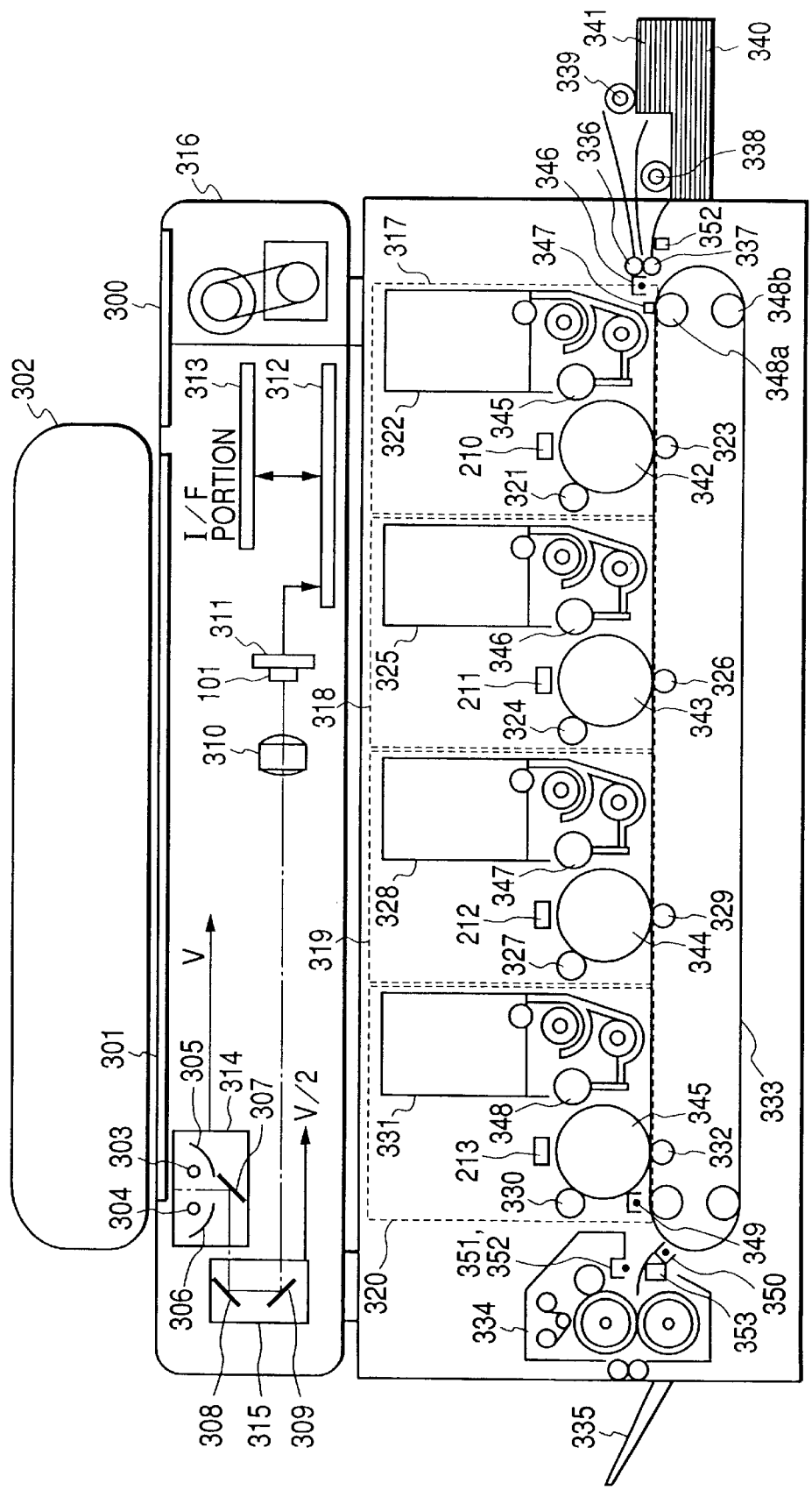
FIG. 4 is a schematic sectional view of an image forming apparatus according to the first embodiment of the present invention.

FIG. 4 shows the schematic arrangement of the overall color image forming apparatus, and the arrangement of a color reader unit will be explained first.

The color reader unit comprises a CCD 101, a board 311 on which the CCD 101 is mounted, a printer processor 312, an original table glass (platen) 301, a document feeder 302 (some arrangements have a mirror surface pressure plate or white pressure plate (not shown) in place of the document feeder 302, light sources 303 and 304 such as halogen lamps or fluorescent lamps for illuminating an original, reflectors 305 and 306 for focusing light emitted by the light sources 303 and 304 on an original, mirrors 307 to 309, a lens 310 for focusing light reflected by an original or projected light onto the CCD 101, a carriage 314 which houses the halogen lamps 303 and 304, reflectors 305 and 306, and mirror 307, a carriage 315 which houses the mirrors 308 and 309, and an interface (IF) 313 with another IPU or the like. Note that the carriages 314 and 315 respectively mechanically move at speeds V and V/2 in a direction perpendicular to the electrical scanning (main scanning) direction of the CCD 101, thus scanning (sub-scanning) the entire surface of the original.

The arrangement of a printer unit in FIG. 4 will be explained below. The printer unit comprises a magenta (M) image forming section 317, a cyan (C) image forming section 318, a yellow (Y) image forming section 319, and a black (K) image forming section 320. Since each of these sections has the same arrangement, the M image forming section 317 will be explained in detail below, and a description of other image forming sections will be omitted.

The M image forming section 317 includes a photosensitive drum 342, on the surface of which a latent image is formed by light emitted by an LED recording head 210. A primary charger 321 charges the surface of the photosensitive drum 342 to a predetermined potential to prepare for latent image formation. A developer 322 develops the latent image formed on the photosensitive drum 342 to form a toner image. Note that the developer 322 includes a sleeve 345 for applying a developing bias to achieve development.

A transfer charger 323 discharges from the back surface side of a transfer medium conveyor belt 333, and transfers the toner image on the photosensitive drum 342 onto a recording paper sheet or the like on the transfer medium conveyor belt 333. Since this embodiment has high transfer efficiency, no cleaner is provided. However, a cleaner may be provided.

A procedure for transferring a toner image onto a transfer medium such as a recording paper sheet or the like will be explained below. Transfer media such as recording paper sheets or the like stored in a cassette 340 or 341 are picked up one by one by a pickup roller 339 or 338, and the picked-up transfer medium is fed onto the transfer medium conveyor belt 333 by paper feed rollers 336 and 337. The fed recording paper sheet is charged by an attraction charger 346. Transfer medium conveyor belt rollers 348a and 348b drive the transfer medium conveyor belt 333, and charge a recording paper sheet or the like in combination with the attraction charger 346 to attract the recording paper sheet or the like on the transfer medium conveyor belt 333. Note that the transfer medium conveyor belt rollers 348a and 348b may be driving rollers for driving the transfer medium conveyor belt 333, or driving rollers for driving the transfer medium conveyor belt 333 may be set on the side opposite to these rollers.

A paper leading end sensor 347 detects the leading end of the recording paper sheet or the like on the transfer medium conveyor belt 333. Note that the detection signal of the paper leading end sensor 347 is supplied from the printer unit to the color reader unit, and is used as a sub-scanning sync signal upon sending a video signal from the color reader unit to the printer unit.

After that, the recording paper sheet or the like is conveyed by the transfer medium conveyor belt 333, and toner images are formed on its surface by the image forming sections 317 to 320 in the order of M, C, Y, and K. The transfer medium such as a recording paper sheet that has left the K image forming section 320 undergoes charge removal by a charge remover 349 to be easily separated from the transfer medium conveyor belt 333, and is then separated from the transfer medium conveyor belt 333. A peeling charger 35CI prevents image disturbance due to peeling discharging upon separating the recording paper sheet or the like from the transfer medium conveyor belt 333. The separated recording paper sheet or the like is charged by pre-fixing chargers 351 and 352 to compensate for the toner attraction force and to prevent image disturbance. Then, the toner image is thermally fixed on the recording paper sheet by a fixing device 334, and the recording paper sheet is exhausted onto an exhaust tray 335.

In this embodiment, vibration type (vibration wave) motors are used as drive motors for rotating the photosensitive drums 342 to 345, and a vibration type (vibration wave) motor is also used as a drive motor for rotating the driving roller which rotates the transfer medium conveyor belt 333.

The vibration type motor (to be referred to as a vibration wave motor hereinafter) obtains a driving force by applying periodic signals having different phases to an electromechanical energy conversion element portion, such as a piezoelectric member provided with a vibration member, to excite/generate vibration in the vibration member, i.e., uses a plurality of vibrations excited in the vibration member by frequency normally in the ultrasonic range. The driving frequencies of the periodic signals, the driving voltage, and the pulse width of the driving voltage are controlled in accordance with a speed detection signal which is detected by a speed sensor for detecting the driving speed of the motor and is used for stably rotating the motor at constant speed.

Figure 1B:
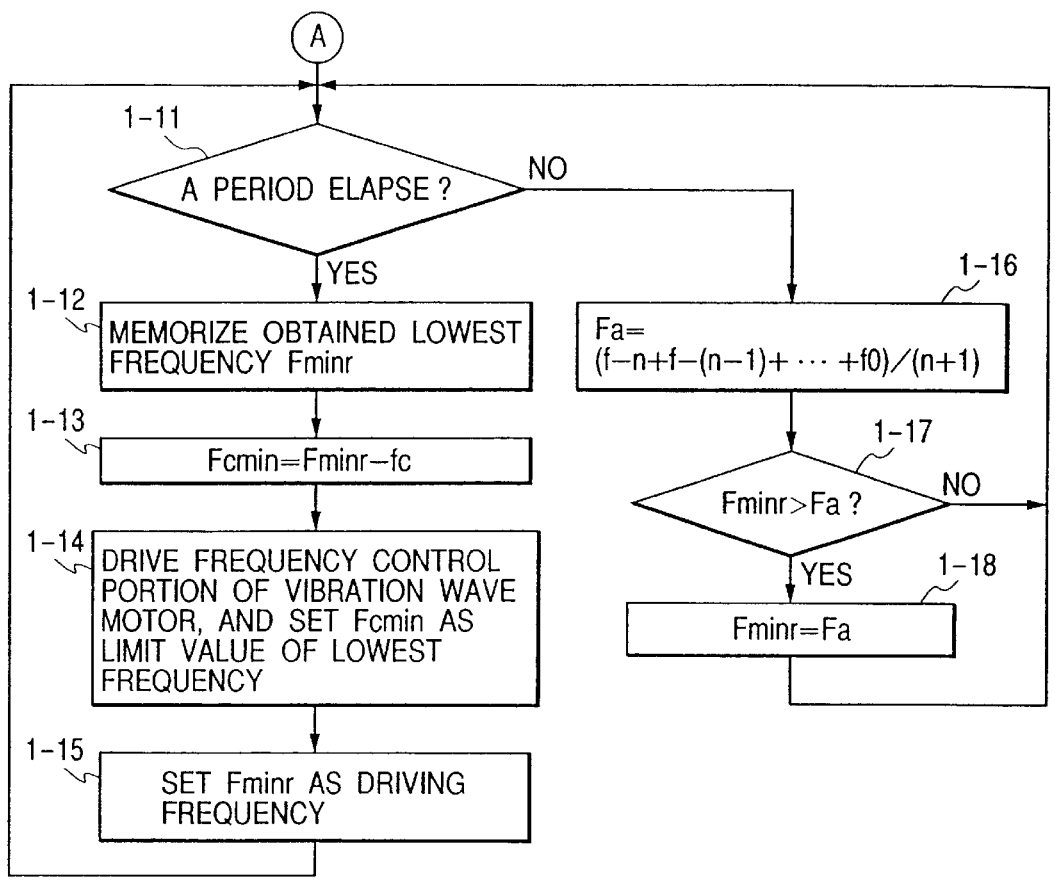
Figure 1C:
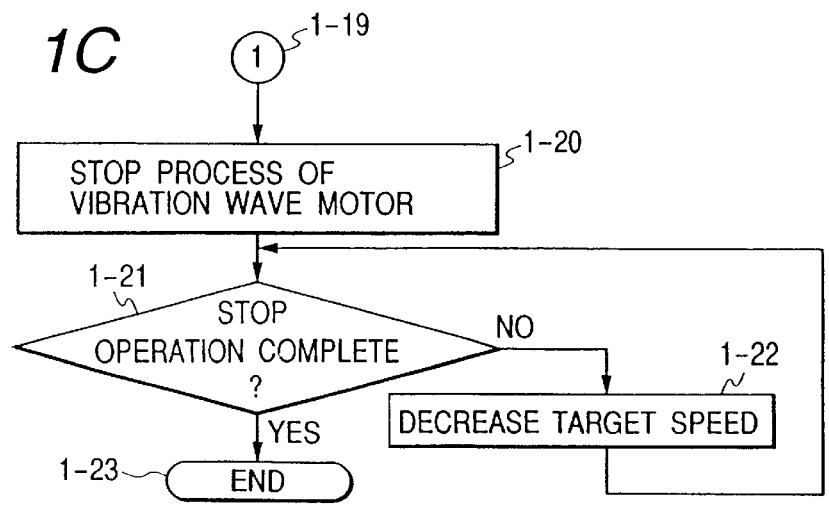
Figure 2:
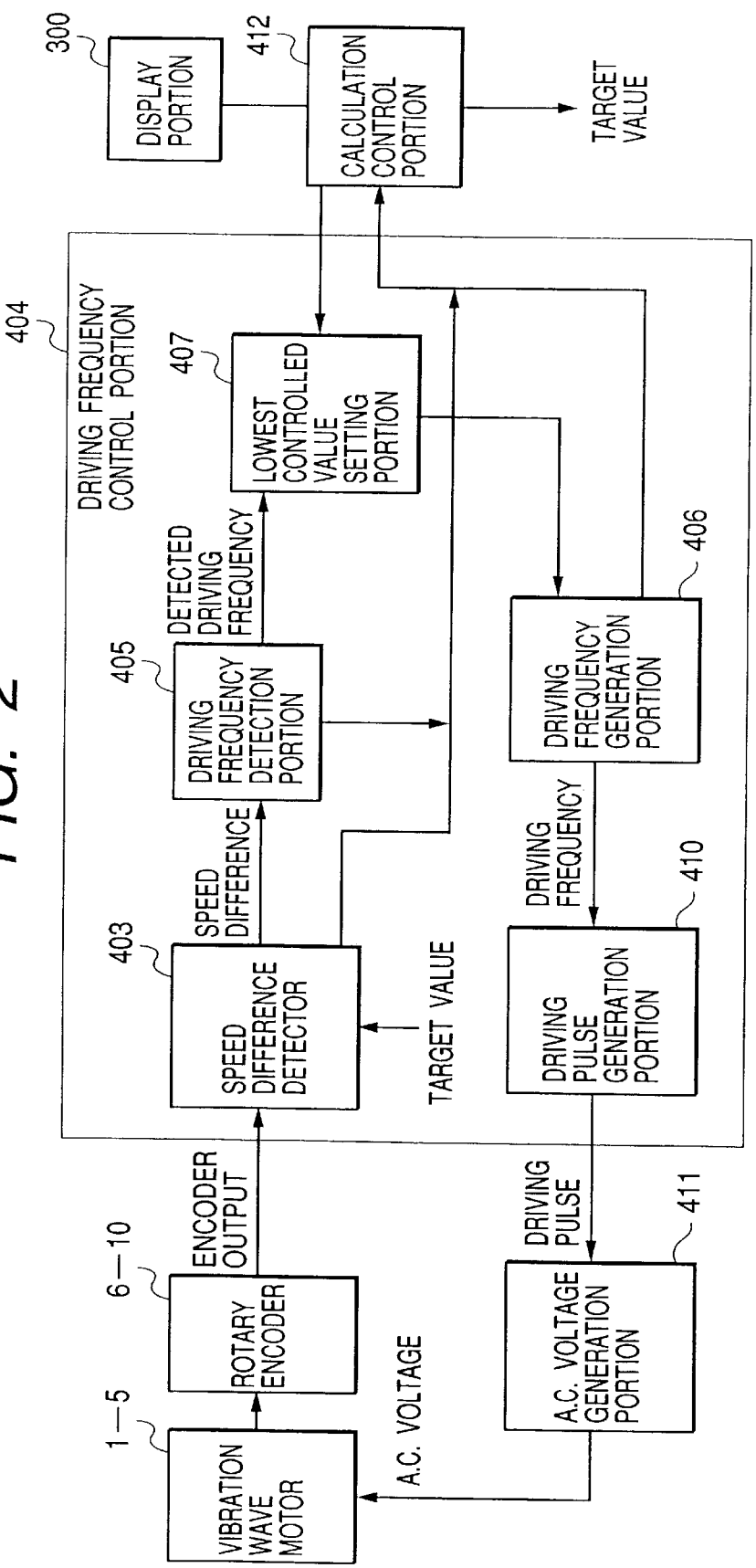
FIG. 2 is a control block diagram showing the first embodiment of the present invention.

FIGS. 1A, 1B and 1C are operation flow charts of this embodiment, and FIG. 2 is a control block diagram for the vebration wave motor, and FIGS. 3A and 2B are flow charts for obtaining the driving frequency for a cotrol block.

A method of obtaining the lower limit value of the driving frequency upon rotating the motor will be explained below with the aid of FIGS. 1A to 1C.

1-1: Rotation of vibration wave motors is started.

1-2: Upon starting up the vibration wave motors, a driving frequency is set in each of driving frequency control portions 404 (which are provided in units of motors) for five vibration wave motors.

1-3: Pulses with frequency corresponding to the driving frequency signal set in each driving frequency control portion 404 are applied to the corresponding vibration wave motor, thus starting up the vibration wave motor.

1-4: A target speed α is set (the driving frequency is controlled to obtain the target speed α).

1-5: It is checked if the driving speed has reached the target speed, i.e., if the startup process is complete. Upon starting up the motor, since the vibration wave motor is sequentially controlled to reach the target speed, it is checked if the driving speed has reached the target speed. Upon starting up the motor, since the driving speed is lower than the target speed, and a control system sequentially increases the driving speed, the driving frequency is decreased in step 1-6.

As a method of decreasing the driving frequency, a predetermined value may be subtracted from the current driving frequency. Also, the target speed may be set, and the driving frequency may be controlled in accordance with the current speed with respect to that target speed.

In this manner, the driving frequency is lowered to reach the target speed, and if the target speed is reached, a measurement of the lower limit value of the driving frequency is started in step 1-7.

Not only a vibration wave motor but also a driving system have certain periodic operations. In this embodiment, four vibration wave motors are used for the photosensitive drums, and one vibration wave motor is used as a recording paper sheet convey motor.

For this reason, the time required per revolution of the drum is set to be one period of the vibration wave motor for the drum in step 1-8, and one revolution of the recording paper sheet convey motor is set to be one period for the vibration motor serving as the recording paper sheet convey motor in step 1-9. Then, the minimum value of the driving frequency in units of periods is obtained.

1-10: A measurement register Fminr for the lowest driving frequency is cleared.

1-11: In order to define the measurement period, the time required per revolution of the drum is detected for the drum motor, one rotation time of the recording paper sheet conveyor belt is detected for the recording paper sheet convey motor, and the lowest frequency of the driving frequency is obtained for each period.

Steps 1-16 to 1-18 form a measurement routine. In step 1-16, an average process is done to reduce the influences of point a in FIG. 5 (the minimum value of the driving frequency during operation). As for this average value, the number of samples to be averaged must be adjusted depending on the load drift amount.

f0 rep resents the previous driving frequency, f−1 represents the driving frequency before the previous one, and Fa represents the average result of those frequencies. (Every time the driving frequency fluctuates during one period, a minimum frequency <point f in FIG. 5> is detected as each driving frequency, and the average value Fa of such minimum frequencies is calculated.)

1-17: Fa is compared with Fminr. If Fa is smaller than Fminr, the flow advances to step 1-18; otherwise, the flow returns to step 1-11. In the first process, since Fminr is cleared in step 1-10, the driving frequency upon startup is set in Fminr.

1-18: Operation for replacing the value Fminr by Fa is done within one period. With this operation, the minimum value of Fa within one period is set in Fminr.

On the other hand, if one period has elapsed in step 1-11, the obtained Fminr is stored in step 1-12, and the flow advances to step 1-13.

1-13: In order to set a control lower limit value for the value Fminr, fc (e.g., 100 Hz or the like) is further subtracted from the lowest value of the current driving frequency to obtain Fcmin.

1-14: The value Fcmin is set in the corresponding driving frequency control portion, and is used as a limit value of the lowest frequency of driving control that will be explained later with reference to FIGS. 3A and 3B.

1-15: After Fcmin is set, Fminr is cleared to obtain data for the next period. In this case, Fminr is set at the driving frequency (high frequency) upon startup.

Note that steps 1-19 to 1-23 shown in FIGS. 1A, 1B and 1C are executed upon completion of, e.g., a process (not shown) when the motor stops. That is, the frequency is increased by a predetermined value in step 1-22, and the motor is then stopped.

Figure 14:
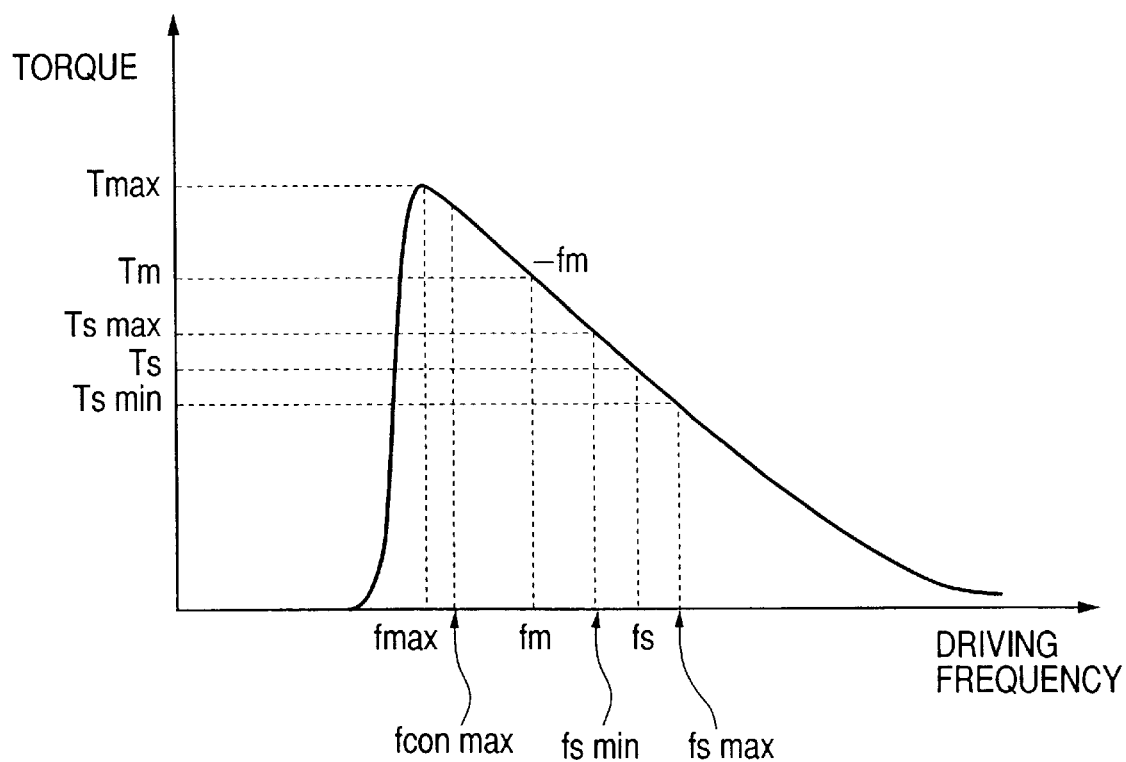
FIG. 14 is a graph showing the relationship between the driving frequency and the torque of a vibration wave motor.

FIG. 14 is a graph showing the relationship between the driving frequency and the torque of the vibration wave motor.

Normally, a driving system has an assumed load torque (design value or examined value), Ts corresponds to this value, and fs is the driving frequency at that time. The load on the driving system changes within the range from Tsmax to Tsmin to have Ts as the center in this embodiment.

In this state, a scheme for setting fc will be explained below.

In a system for obtaining the lowest frequency, $$fc = fsmin - fm \quad (1)$$

where fm is an intermediate value between Tmax and Tsmax.

$$fc = fsmax - fsmin \quad (2)$$

the fluctuation width of the frequency upon controlling the driving system $$fc = (fs - fmax)/2 \quad (3)$$

$$fc = fconmax - fsmin \quad (4)$$

where fconmax is the maximum frequency that the vibration wave motor can control. In practice, when the frequency approaches from fconmax to fmax, the rotor and stator of the vibration wave motor begin to slip, and the vibration wave motor becomes uncontrollable at a certain frequency.

$$\delta c = (fconmax - fsmin) - \alpha \quad (5)$$

where $\alpha$ is the margin.

Figure 3B:
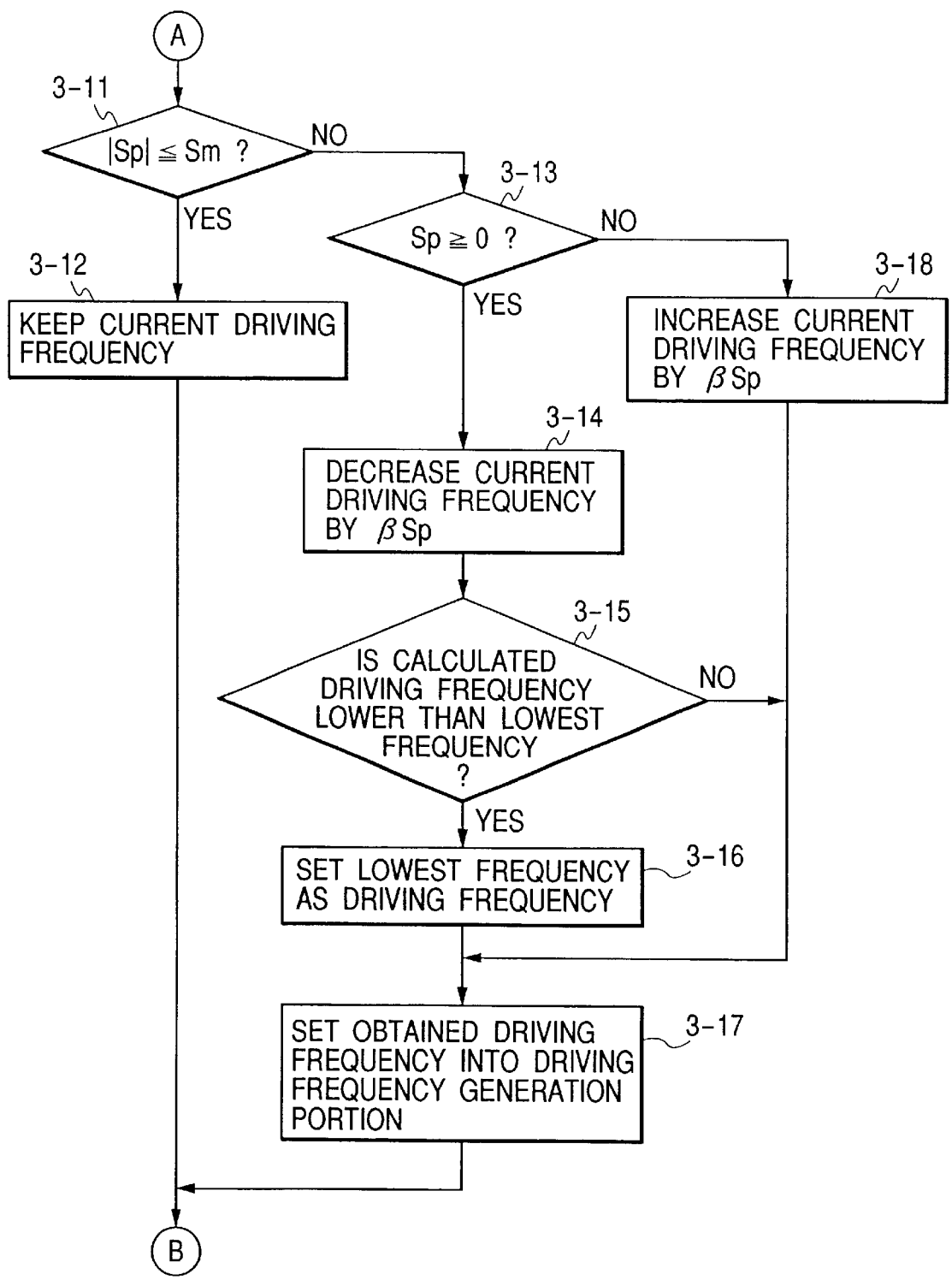
FIG. 3, composed of FIGS. 3A and 3B, is a flow chart for obtaining the driving frequency of the first embodiment.

Speed control of the vibration wave motor will be explained below with reference to FIGS. 2, 3A and 3B. One of vibration wave motors 1 to 4 for rotating the photosensitive drums 342 to 345 and vibration wave motor 5 for conveying a recording paper sheet will be taken as an example, and a plurality of blocks shown in FIG. 2 are provided in correspondence with the motors in practice. In FIG. 2, 1 to 5 represent the vibration wave motors, which will be explained below as the vibration wave motor 5 for conveying a recording paper sheet.

A rotary encoder 10 is coaxially attached to that vibration wave motor to detect its rotational speed (also rotary encoders 6 to 9 are coaxially attached to other vibration wave motors 1 to 4), and generates pulses in correspondence with the rotational speed of the vibration wave motor 5. In this embodiment, these pulses are input to the corresponding driving frequency control portion. A speed difference detector 403 detects the speed difference between the signal from the rotary encoder 10 and the target speed.

In this embodiment, as a method of detecting the current rotational speed of the vibration wave motor, the time between two adjacent leading edges of pulses output from the rotary encoder is detected, thereby detecting the rotational speed of the vibration wave motor. In addition to the method of this embodiment, the rotational speed of the vibration wave motor can be detected based on, e.g., the number of pulses for a predetermined period of time as long as the rotary encoder has high pulse precision.

The speed difference detector 403 detects the difference between the detected speed and the target value set by a calculation control portion 412, and sends the speed difference from the target value to a driving frequency detection portion 405. As will be described later (FIGS. 3A and 3B), the frequency is calculated to decrease the driving frequency with respect to the current driving frequency when the speed is increased or to increase the driving frequency when the speed is decreased, and a lowest controlled value setting portion 407 that sets the lowest limit value of the driving frequency checks if the lower limit value of that frequency is smaller than the set lower limit value. After that, the driving frequency is sent to a driving frequency generation portion 406.

The driving frequency generation portion 406 generates clocks having the obtained driving frequency, and a driving pulse generation portion 410 generates a given number of pulses based on the generated clocks. An AC voltage generation portion 411 boosts the driving pulses to generate an AC voltage, and supplies the AC voltage to a piezoelectric element of a vibration member of the vibration wave motor, thus controlling rotation of the vibration wave motor.

The actual control flow will be explained below with reference to FIGS. 3A and 3B.

The calculation control portion 412 begins to start up the vibration wave motor in step 3-1, and an initial driving frequency for each of the vibration wave motors 1 to 5 is set in the corresponding driving frequency control portion 404 in step 3-2. In step 3-3, a target speed is set. The speed is increased in accordance with this target speed in the following flow.

3-4: The speed difference detector 403 compares the speed with the target speed. If the target speed has not been reached, the flow advances to step 3-7, and the speed difference detector 403 calculates a speed difference Sp.

3-8: The current driving frequency is decreased by $\beta$Sp in correspondence with the speed difference value.

Note that comparison control has been explained in this embodiment, but a method of obtaining a value to be corrected by Sp may use a combination of PID control processes which are popular in control theory. Various calculation methods and parameter values such as $\beta$ and the like may be used depending on cases, i.e., objects to be controlled.

3-9: The driving frequency calculated in step 3-8 is set in the driving frequency generation portion 406 to increase the speed of the vibration wave motor. In order to increase the speed of the vibration wave motor stepwise, if the target speed has been reached in step 3-4, the flow advances to step 3-5 to check if startup operation is complete.

3-5: Since the speed is increased gradually, it is checked if the final speed has been reached. If startup operation is in progress, the target speed is increased in step 3-6, and the speed of the vibration wave motor is gradually increased to the final speed. If the predetermined final speed has been reached, constant speed control is started. (Note that startup operation shifts the motor speed to the final target speed while gradually increasing the target speed.)

3-10: The speed difference Sp is calculated, and its absolute value is compared.

Step 3-11: If the absolute value is smaller than Sm as a predetermined comparison value (in case of a small speed difference), the flow advances to step 3-12; otherwise, the flow advances to step 3-13.

3-12: The motor is driven while keeping the driving frequency (the control system may have only step 3-13 without this step).

3-13: The sign of the speed difference is checked. If the speed difference has a positive sign, the flow advances to step 3-14; otherwise, the flow advances to step 3-18.

That is, if the speed difference has a positive sign, it is determined that the current speed is lower than the target speed, and a subtraction process for the current driving frequency is executed in step 3-14 to decrease the driving frequency.

On the other hand, if the speed difference has a negative sign, it is determined that the current speed is higher than the target speed, and the driving frequency is calculated to increase it in step 3-18. After that, the flow advances to step 3-17.

3-15: The calculated driving frequency is compared with the lowest frequency (Fcmin), which is calculated in the flow chart shown in FIGS. 1A, 1B and 1C and set in the control portion. If the calculated driving frequency is lower than the lowest frequency, the lowest frequency is substituted in the driving frequency in step 3-16; otherwise, the calculated driving frequency is set in the driving frequency generation portion 406 in step 3-17 to drive the vibration wave motor by that driving frequency. The flow returns to step 3-10 to repeat the aforementioned processes, thus stably driving the vibration wave motor.

Figure 5:
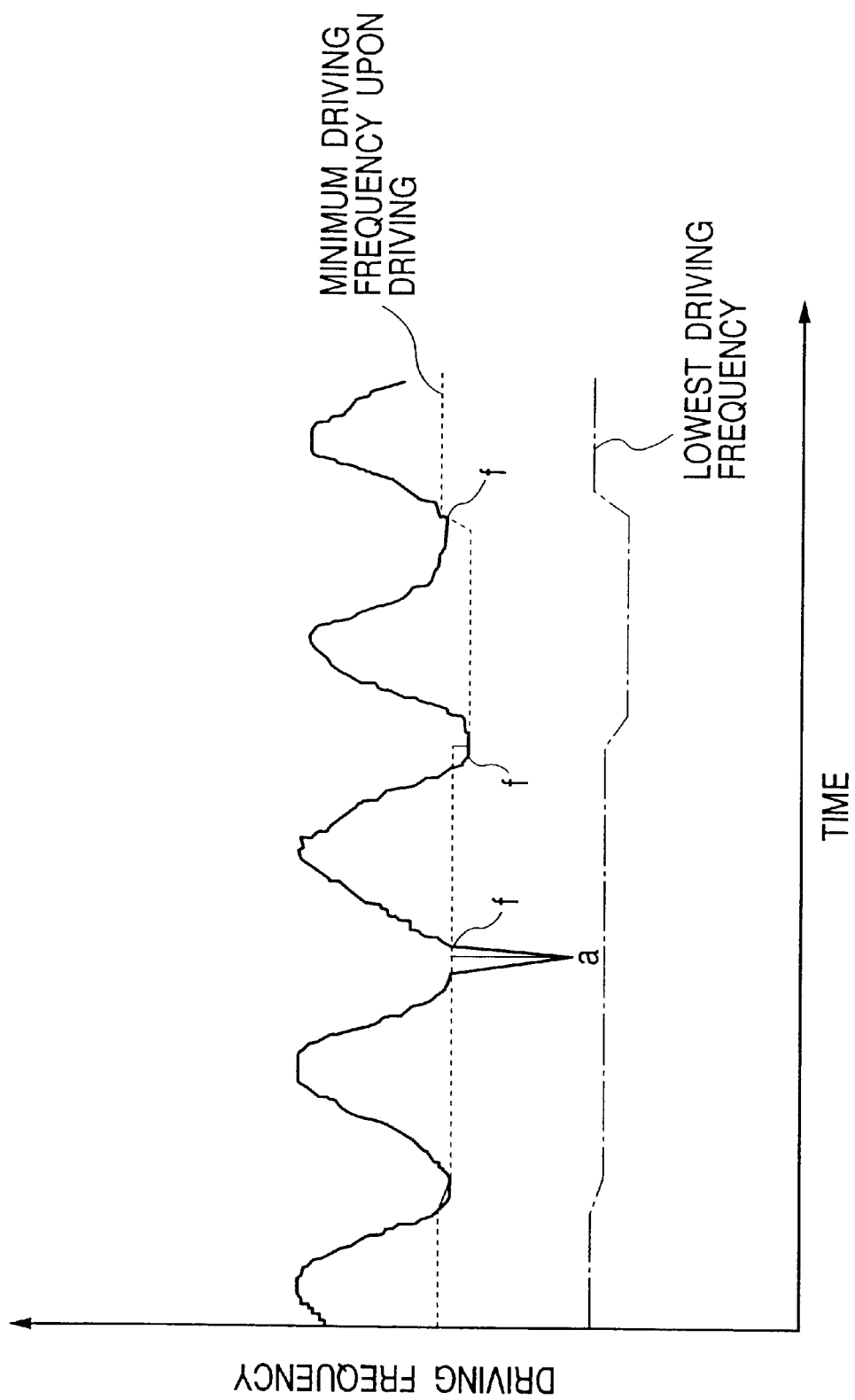
FIG. 5 is a graph showing the relationship between the driving frequency fluctuation and the lowest driving frequency in the first embodiment.

FIG. 5 shows the calculated driving frequency of the vibration wave motor indicated by a solid curve, the calculated minimum value indicated by a dotted curve, and the calculated lower limit value of the driving frequency indicated by a one-dashed chain curve.

With this control, a motor, which stops by over-correction due to a load drift in conventional control, as indicated by point b in FIG. 12, can operate without coming to a stop. The flow chart for calculating the lowest frequency in FIGS. 1A, 1B and 1C may be executed for a predetermined period of time upon power-on of the apparatus, or a mode for executing the flow chart in FIGS. 1A, 1B and 1C may be provided as one of the modes of the apparatus, and the flow chart may be executed when this mode is selected. Or the processes in steps 1-7 to 1-18 in FIGS. 1A, 1B and 1C may be periodically executed during execution of constant speed control after completion of startup operation in the flow chart of FIGS. 3A and 3B. The flow charts shown in FIGS. 1A, 1B, 1C, 3A and 3B may be set as computer programs when the functions of the driving frequency control portion shown in FIG. 2 except for the driving pulse generation portion and the function of the calculation control portion are processed by a computer.

Second Embodiment

In the second embodiment, the upper limit value of the driving frequency is added to the control state of the driving frequency in the above embodiment to prevent an abrupt speed drift due to a transient control response. FIGS. 6A, 6B, 6C, 7A and 7B are flow charts for explaining this embodiment, and FIG. 8 shows the control result of this embodiment.

The overall flow chart will be explained below with reference to FIGS. 6A, 6B and 6C, but a description of the same steps as those in FIGS. 1A, 1B and 1C will be omitted.

Figure 6A:
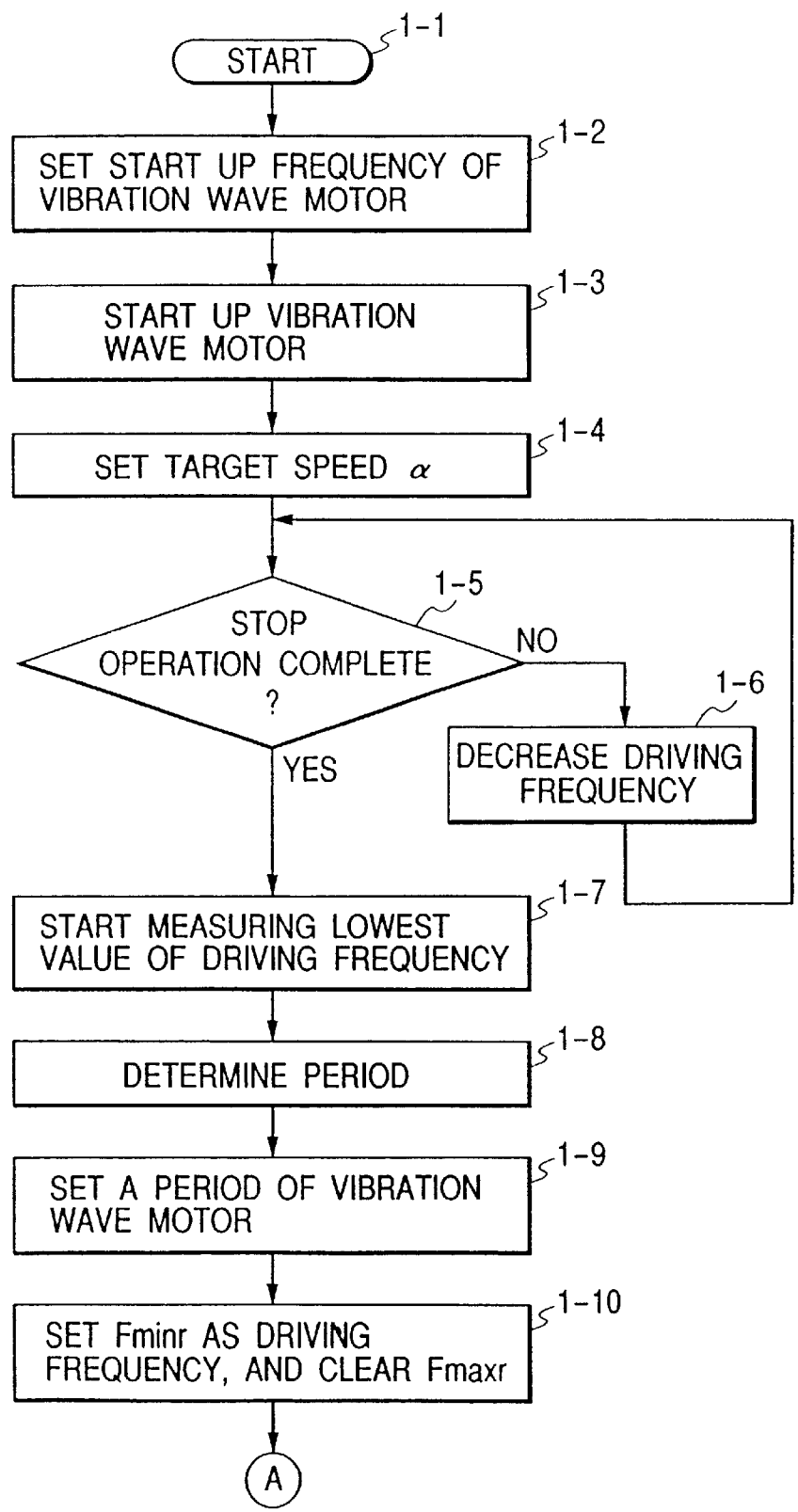
FIGS. 6A, 6B and 6C are flow charts showing the operation according to the second embodiment of the present invention.
Figure 6B:
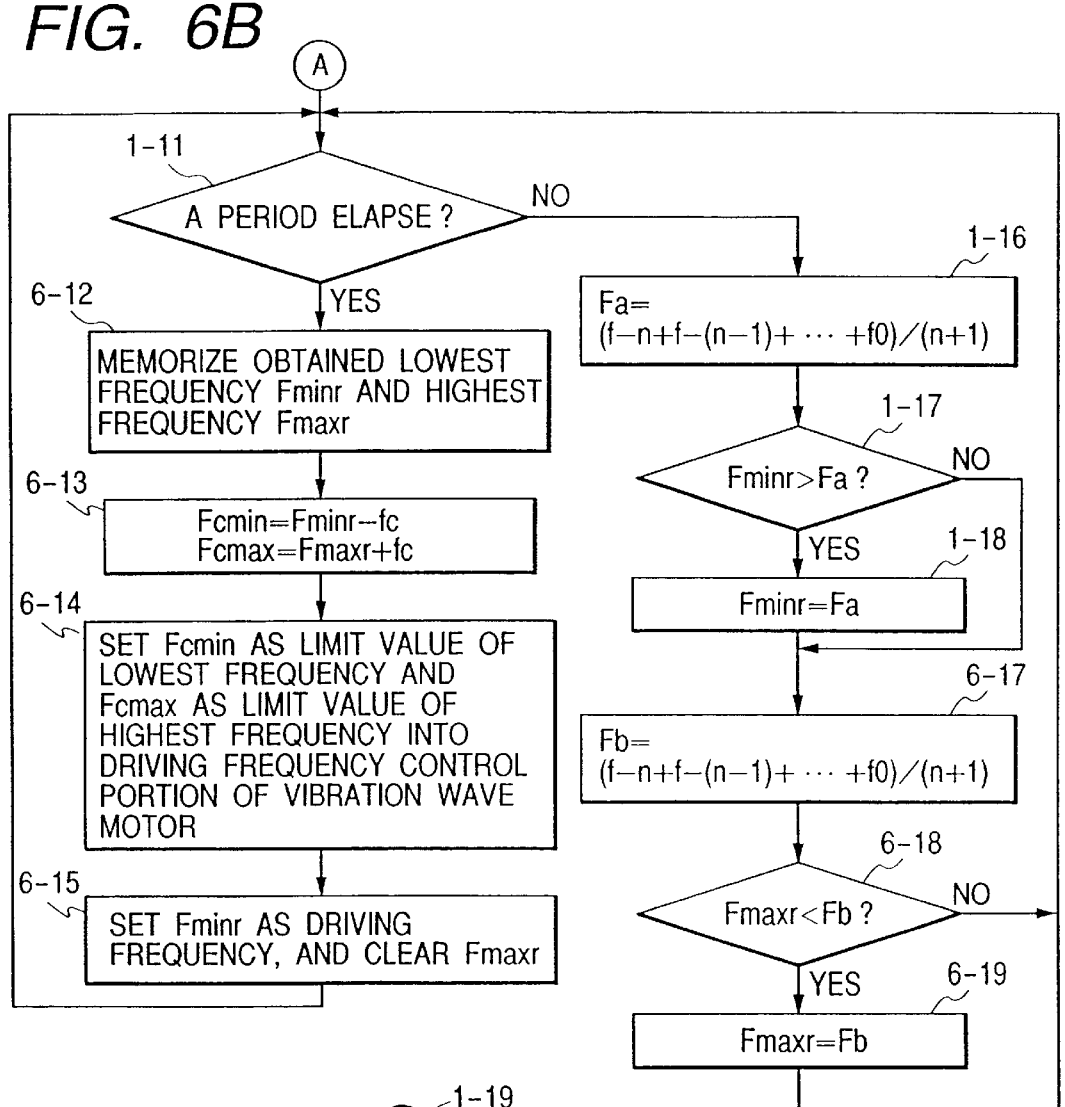
Figure 6C:
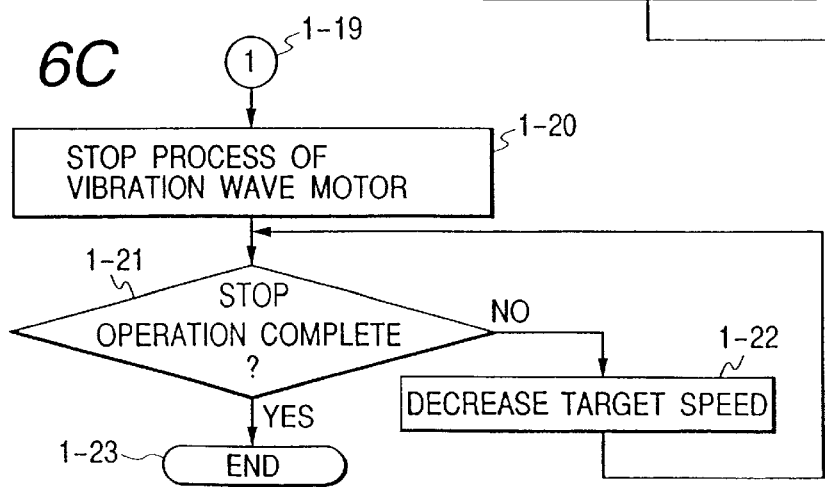

Since steps 1-1 to 1-9 in FIGS. 6A, 6B and 6C are the same as those in FIGS. 1A to 1C, a description thereof will be omitted. Note that one rotation of the transfer belt is set to be one period.

1-10: A value Fminr is set as a startup frequency (large value), and a value Fmaxr (a register for obtaining the maximum value of the driving frequency) is cleared.

1-11: It is checked if one period has elapsed. If one period has not elapsed yet, the flow advances to step 1-16; otherwise, the flow advances to step 6-12.

In this routine, the driving frequency of the vibration wave motor or driving system for one period is measured to obtain the maximum value Fmaxr and minimum value Fminr of (n+1) driving frequencies.

1-16: The average value Fa of (n+1) driving frequencies is calculated. In step 1-17, Fminr is compared with Fa. If Fa is smaller than Fminr, the flow advances to step 1-18 to substitute the value Fminr in Fa; otherwise, the flow skips the process in step 1-18 and advances to step 6-17. Since these processes are the same as steps 1-16, 1-17, and 1-18 in FIGS. 1A to 1C, a description thereof will be omitted. As a result of the processes, the average value Fa of the lowest frequencies is obtained. In step 6-17, the highest frequency (point f in FIG. 5) every time the driving frequency fluctuates during one period is detected, and its average value Fb is calculated. Note that f0 is the previous driving frequency, and f−1 is the driving frequency before the previous one.

6-18: Fmaxr is compared with Fb calculated in step 6-17. If Fb is larger than Fmaxr, Fmaxr is substituted in Fb in step 6-19; otherwise, the flow skips step 6-19, and returns to step 1-11.

If an elapse of one period is detected in step 1-11, the calculated lowest frequency Fminr and highest frequency Fmaxr are stored in step 6-12. In step 6-13, in order to obtain Fcmin and Fcmax to be actually used in control, fc is subtracted from the calculated Fminr, and fc is added to the calculated Fmaxr.

In step 6-14, the lowest frequency Fcmin and highest frequency Fcmax of the driving frequency of the vibration wave motor are set in the vibration wave motor control block.

After that, the control system gives limit values to the driving frequency to be controlled based on the set values. In step 6-15, Fminr is set as a startup frequency, and Fmaxr is cleared.

Note that steps 1-19 to 1-23 shown in FIGS. 6A, 6B and 6C correspond to a stop process.

Figure 7:
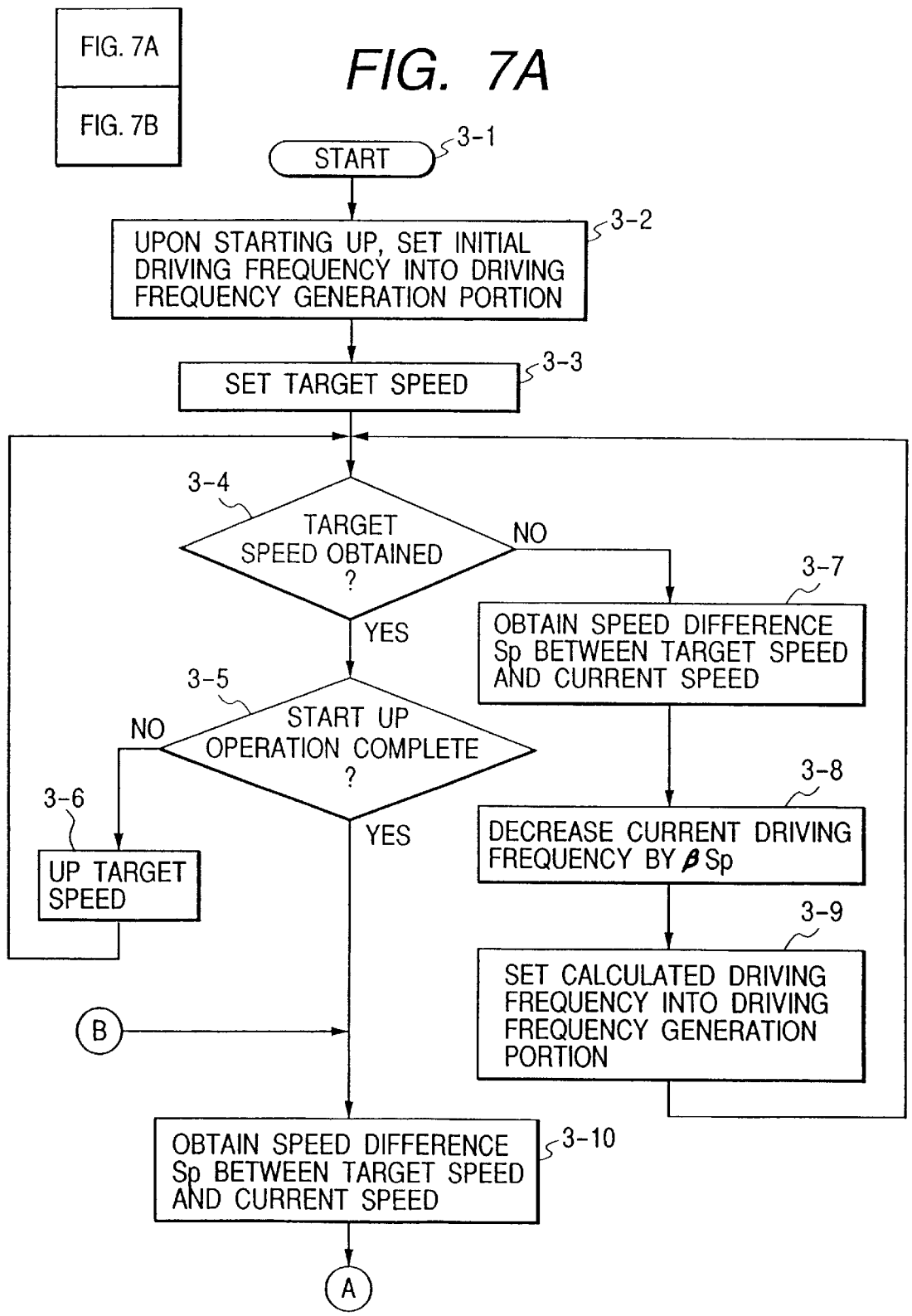
FIG. 7, composed of FIGS. 7A and 7B, is a flow chart for obtaining the driving frequency of the second embodiment.
Figure 7B:
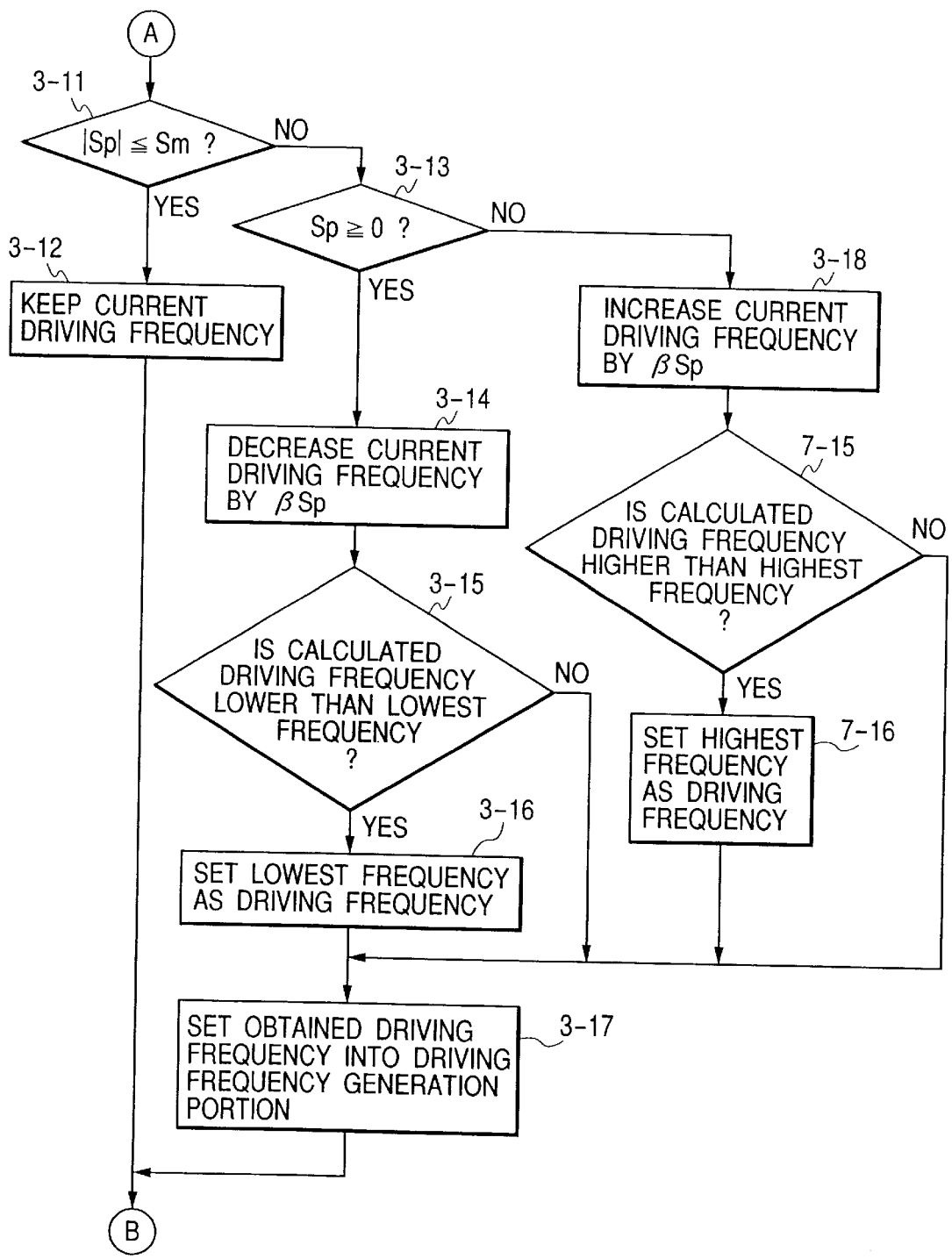
Figure 8:
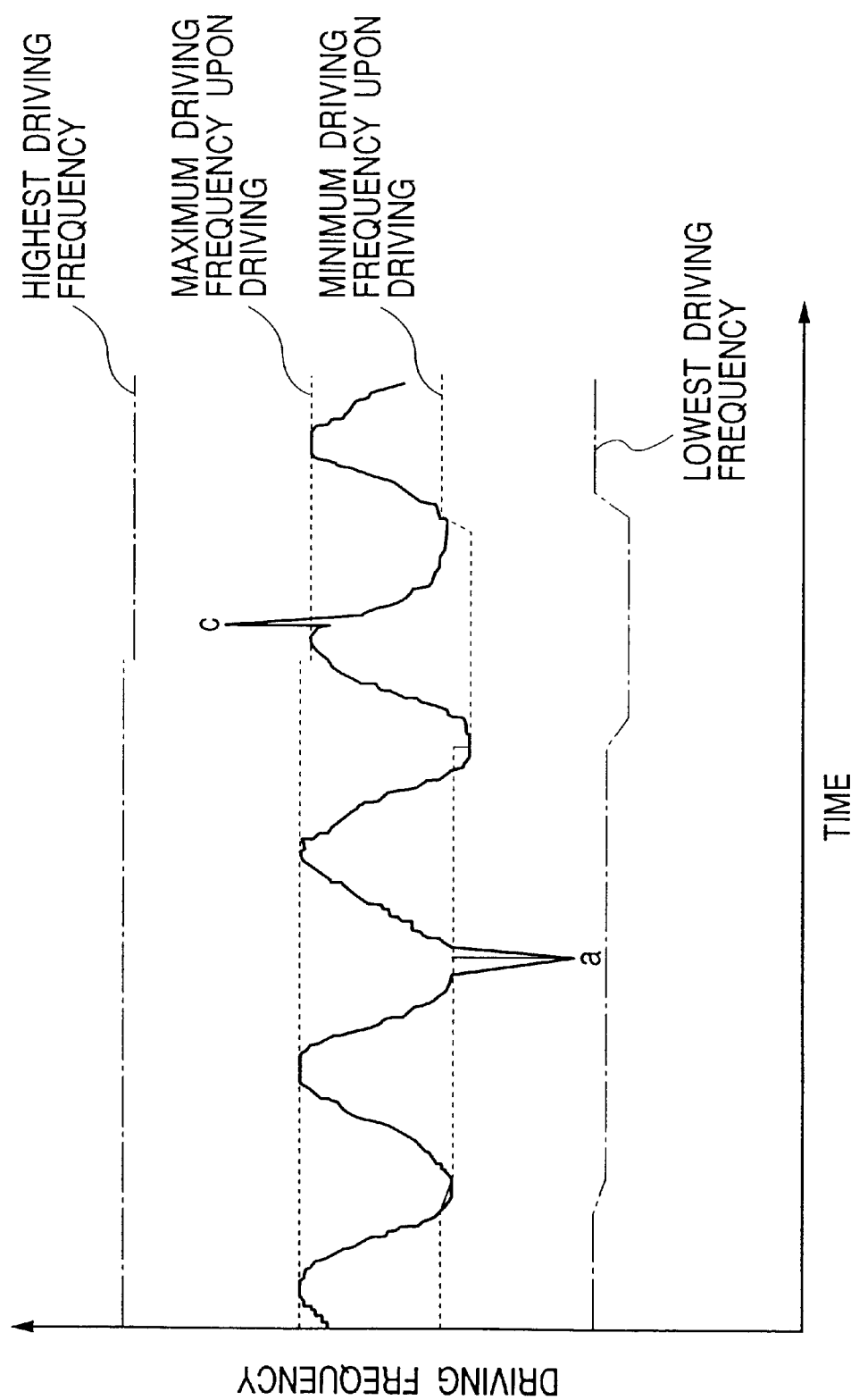
FIG. 8 is a graph showing the relationship between the driving frequency fluctuation, and the highest and lowest driving frequencies in the second embodiment.
Figure 13A:
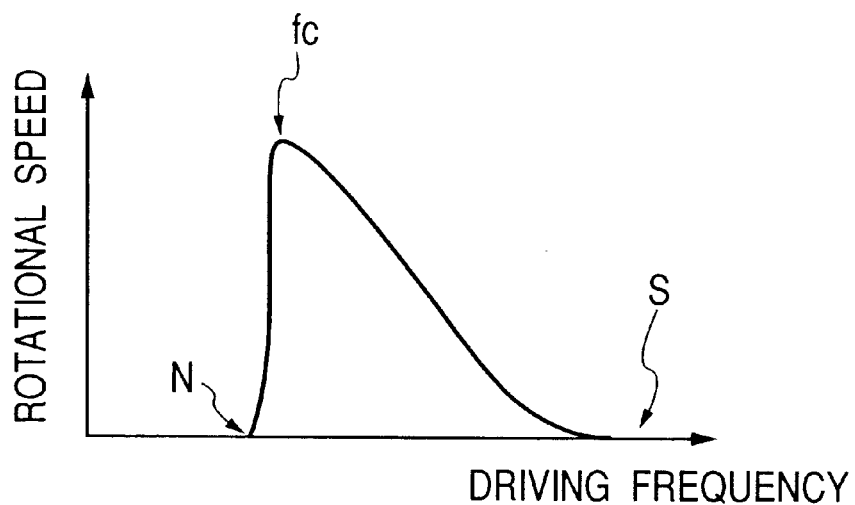
FIG. 13A is a graph showing the relationship between the driving frequency and the speed of a vibration wave motor.
Figure 13B:
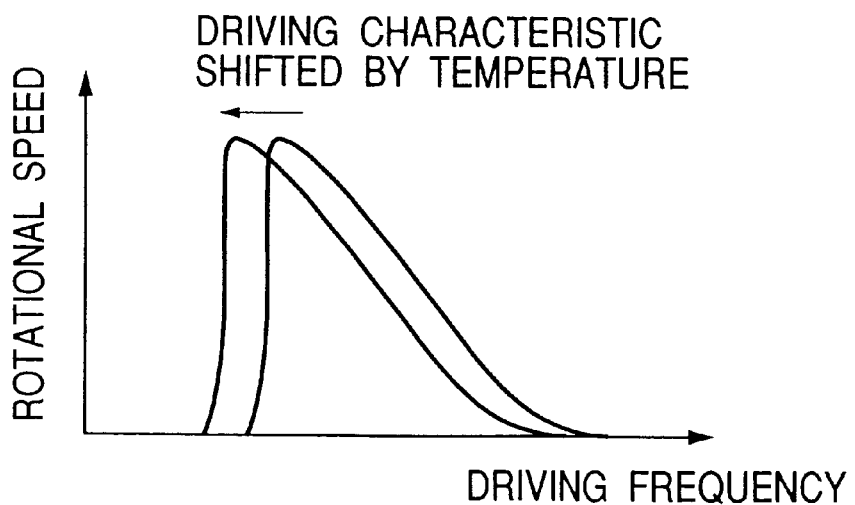
FIG. 13B is a graph showing the driving frequency shift due to temperature shift.

FIGS. 7A and 7B are flow charts for obtaining the driving frequency of the vibration wave motor. In FIGS. 7A and 7B, the maximum frequency can also be limited in addition to the first embodiment described above. Since steps 3-1 to 3-11 in FIGS. 7A and 7B are the same as those in FIGS. 3A and 3B, a description thereof will be omitted.

In step 3-13 in FIGS. 7A and 7B, the sign of Sp is checked. If Sp has a positive sign, the control for decreasing the driving frequency is done as in the first embodiment; otherwise, the flow advances to step 3-18.

If Sp has a negative sign, since the target speed is lower than the current speed, it is determined that the current speed is high.

In step 3-18, a value αsp (β is a parameter) is added to the current driving frequency to increase the driving frequency of the vibration wave motor (when the driving frequency is increased, the speed decreases), thus obtaining a new driving frequency.

At this time, in step 7-15, the calculated driving frequency is compared with the highest frequency set in the control block. If the calculated driving frequency is higher than the highest frequency (Fcmax) set in step 6-14, the calculated driving frequency is replaced by the highest frequency in step 7-16.

If the calculated driving frequency is lower than the highest frequency, upon completion of replacement, the flow returns to step 3-17, and that value is set in the driving frequency generation portion. In this manner, the speed can be controlled.

FIG. 8 shows an example of the above-mentioned control result.

The solid curve in FIG. 8 represents a change in actual driving frequency, point a indicates a case wherein the motor is abruptly overloaded and the driving frequency drops suddenly, and point c indicates a case wherein the driving frequency rises abruptly upon receiving a load in a direction to immediately increase the speed.

In practice, even in the case indicated by point c, the motor nearly stops if the control over-corrects. For this reason, as in this embodiment, by setting the upper and lower limit values of the driving frequency, even when an abrupt load drift results in over-correction, the driving frequency at which the motor can operate stably can be controlled within the range between its upper and lower limit values (one-dashed chain curves in FIG. 8). Note that the dotted curves in FIG. 8 indicate the calculated maximum and minimum values of the driving frequency.

Third Embodiment

In this embodiment, a certain control range is given to the driving frequency which is controlled currently. In the first and second embodiments described above, the maximum and minimum driving frequencies are calculated in units of vibration periods of the driving system, and the upper and lower limit values of the driving frequency are determined based on these values. However, in this embodiment, a simple average process is done, and values obtained by adding and subtracting a given value to and from the average value are determined to be the upper and lower limit values. The dotted line in FIG. 9 represents the average value obtained by the average process.

In this embodiment, since a long average time is set, the fluctuation of the average value represents a change in driving frequency over a long-term range. The one-dashed chain curves in FIG. 9 indicate an example of only the lower limit value of the driving frequency or the upper and lower limit values of the driving frequency set based on the average value.

In this embodiment, only the lower limit value may be required depending on the control system. A considerably long average time may be set, as shown in FIG. 9. Although a short average time may be set, the driving frequency often changes abruptly, as indicated by point a in FIG. 9. When the control range is determined based on the lower peak value at point a, the lowest frequency may fall within an uncontrollable range, which is not suitable for the lower limit frequency of the control.

For this reason, the average value of at least two previous driving frequencies (the number of samples to be averaged varies depending on the load drift state) is preferably calculated.

The number of samples to be averaged of the average value must be sufficiently large such that a point a in FIG. 9 can be removed, and the average value of data several times the time for point a suffices to be calculated.

FIG. 10 shows the result obtained when the number of samples to be averaged is reduced. The one-dashed chain curves indicate the upper and lower limit values of the driving frequency calculated at that time.

Fourth Embodiment

This embodiment uses a different method of calculating the average value of the driving frequency from that in the third embodiment described above. In this embodiment, upon starting up the vibration wave motor, a value based on the average value of driving frequencies obtained a predetermined period of time (e.g., 5 sec) after the startup timing of previous driving is set as the lowest driving frequency for controlling the vibration wave motor. When, for example, 5 sec have elapsed from the startup timing, a value based on the average value of driving frequencies of the currently operating vibration wave motor is set as the lowest frequency.

In this embodiment, the predetermined period of time is set to be 5 sec, but may be a time required until the number of samples reaches the required value by executing the average process after completion of the startup sequence (for increasing the motor speed to a predetermined speed while sequentially controlling the driving frequency from a startable frequency).

Furthermore, an actual apparatus requires a preparation time before the motors and the like are driven and a paper sheet is ready to be fed. The motor condition at that time is often different from that upon actual image formation. For this reason, the measurement mode may be started from the beginning of image formation.

When the motor is driven for the first time (e.g., after the motor is exchanged), since no previous data are available, the motor may be driven for a predetermined period of time without limiting the lowest frequency, and after that, the motor may be driven based on the sampled data.

For this purpose, the apparatus has a storage means for storing the average value obtained after an elapse of a predetermined period of time.

When the apparatus has, e.g., a temperature detection means, and the current temperature has changed from that upon previously calculating the average value after an elapse of a predetermined period of time (e.g., 10 deg) due to a change in environment, the driving frequency of the vibration wave motor decreases due to the temperature rise. Although such frequency variation differs in units of motors, the average value may be corrected by a general value or using a correction table for the change amount in correspondence with the change in temperature, thus further improving precision.

Fifth Embodiment

FIGS. 15 to 18 show the fifth embodiment of the present invention.

Figure 15:
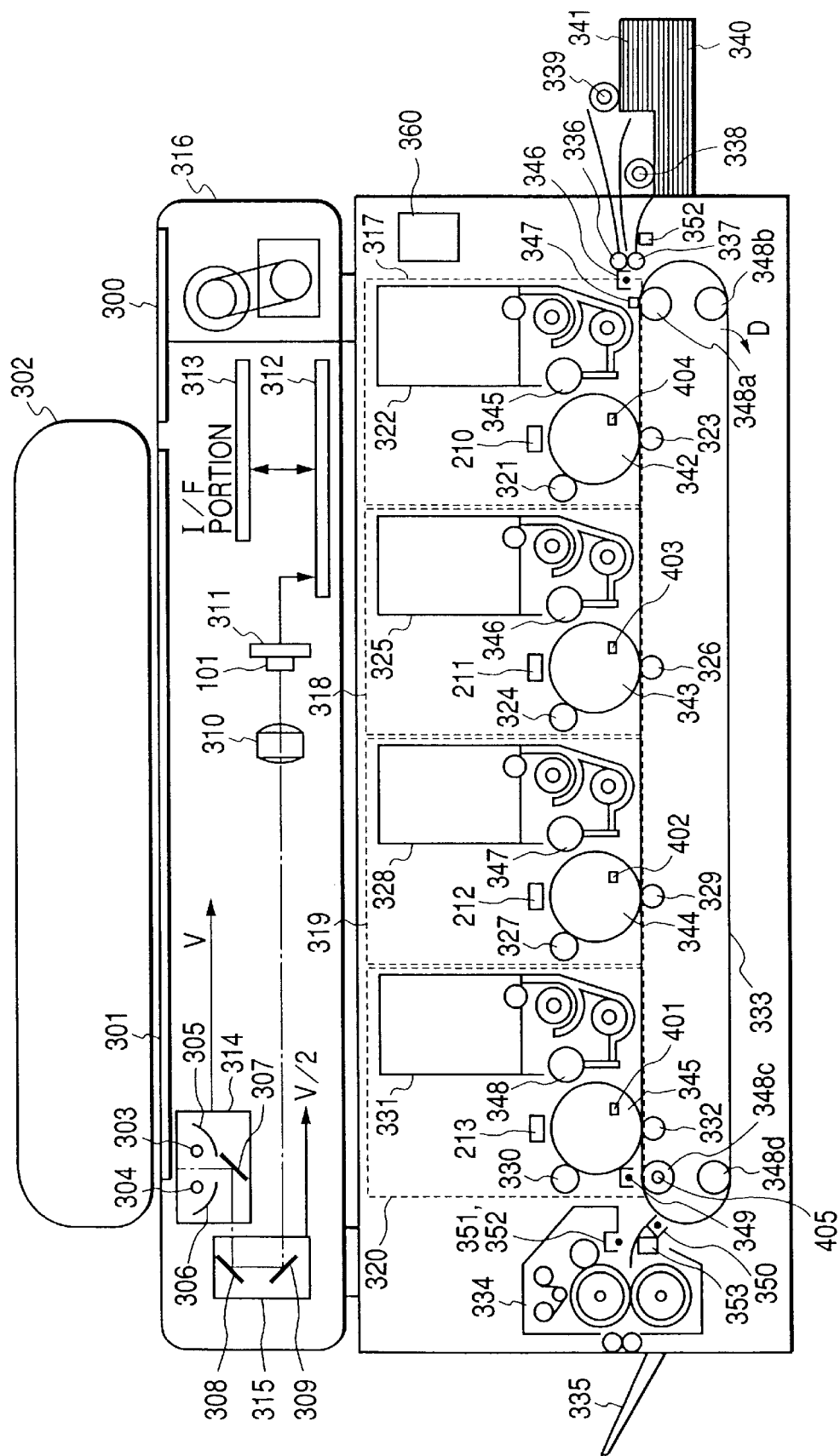
FIG. 15 is a schematic sectional view showing an image forming apparatus in the fifth embodiment of the present invention.

FIG. 15 shows the overall schematic arrangement of a color image forming apparatus, and the arrangement of a color reader unit will be explained first. Note that the same reference numerals in FIG. 15 denote the same parts as those in FIG. 4.

A temperature sensor 360 measures the temperature in the apparatus. This sensor detects temperature by detecting a change in resistance due to a change in temperature, and various methods for implementing such detection are available. In this embodiment, a change in resistance is detected by a voltage to detect the temperature. Using this temperature, various kinds of control of the apparatus are made.

In this embodiment, vibration wave motors are used as drive motors for rotating the photosensitive drums 342 to 345, and a vibration wave motor is also used as a drive motor for rotating the driving roller which rotates the transfer medium conveyor belt 333. Furthermore, each of the temperature sensors 401 to 404 is disposed on each drum, respectively, and the temperature sensor 405 is disposed on the driving roller.

Figure 16:
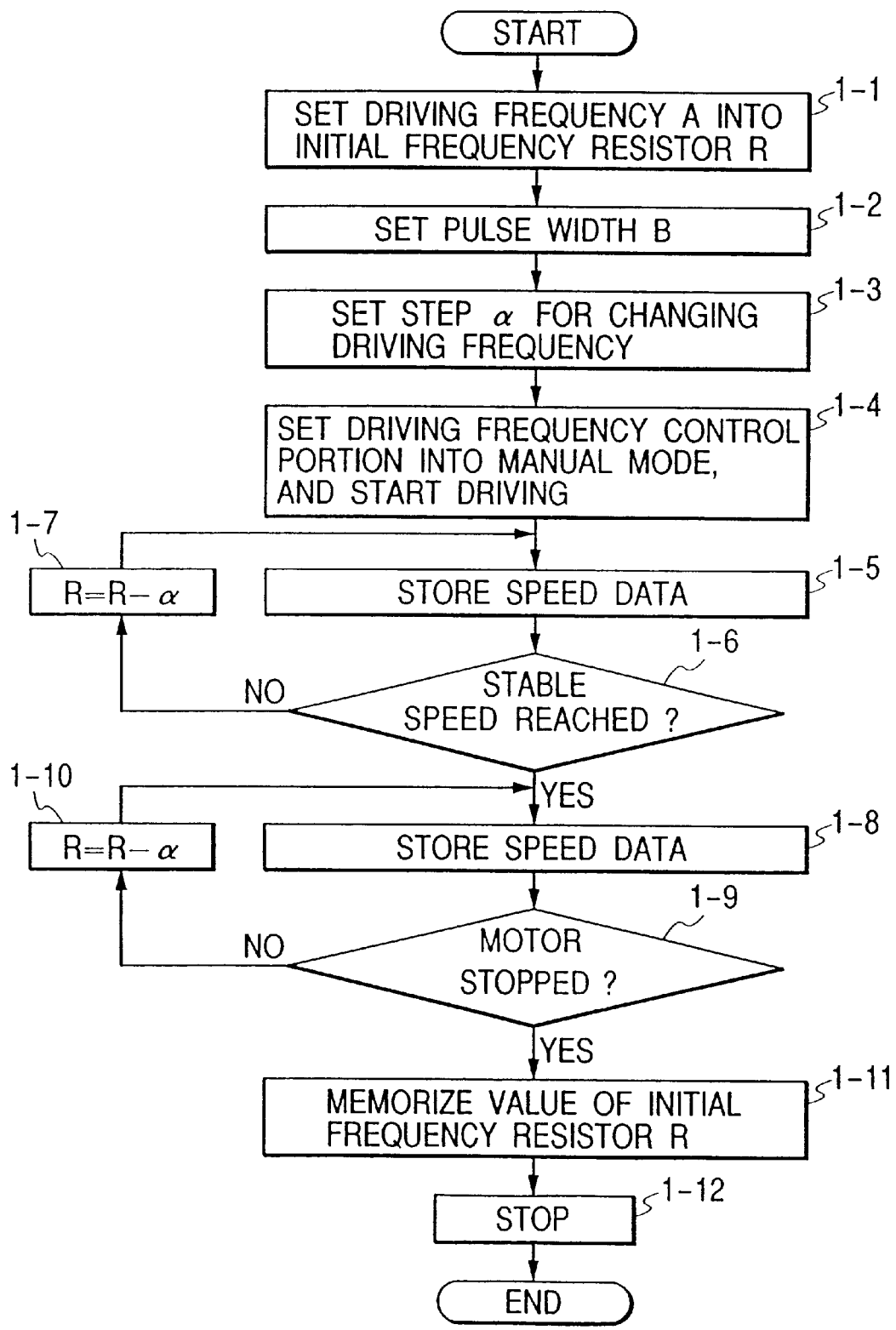
FIG. 16 is a flow chart showing a measurement mode according to the fifth embodiment of the present invention.
Figure 17:
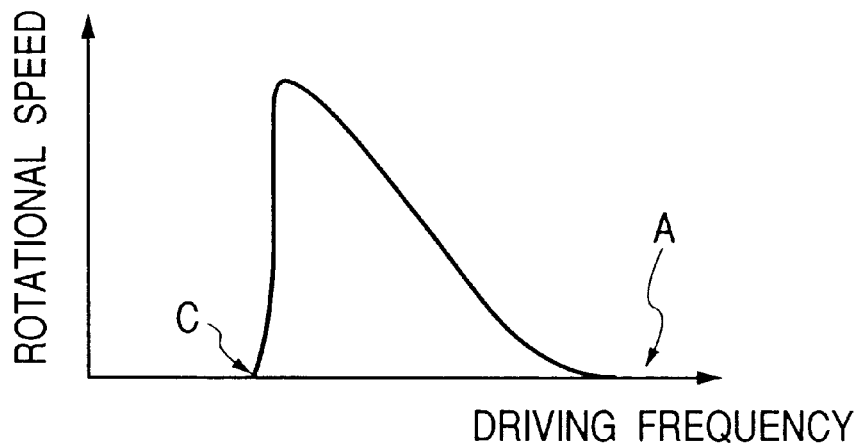
FIG. 17 is a graph showing the driving start and stop frequencies of a vibration wave motor.
Figure 18:
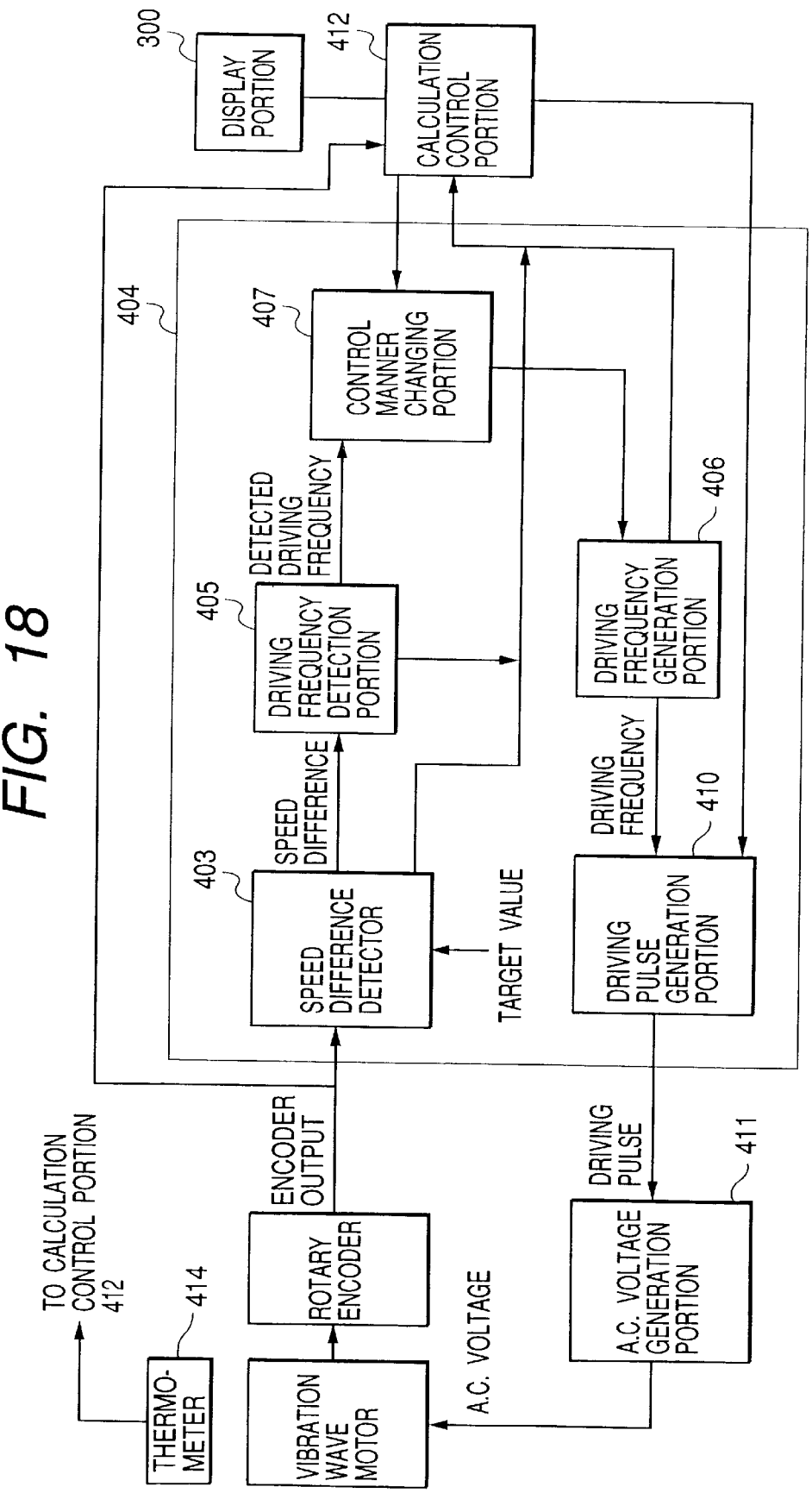
FIG. 18 is a block diagram showing a drive circuit for a vibration wave motor according to the fifth embodiment.

The characteristic features of this embodiment will be explained below with the aid of FIGS. 16 to 18. FIG. 16 is a flow chart of this embodiment, and FIG. 17 is a graph for explaining the characteristics of each vibration wave motor. FIG. 18 is a block diagram for explaining the blocks of a vibration wave motor control portion.

A measurement mode for measuring the characteristics of each vibration wave motor will be explained first. This measurement mode forms a part of preparation operation of the apparatus, which is started after the power supply of the apparatus is turned on, and is executed during an interval between adjacent image formation processes or standby periods and can also be executed by an instruction of a service person or the like.

At this time, since rotation of the vibration wave motors differs from one motor to another, a transfer medium conveyor belt unit of the apparatus in this embodiment can slightly pivot in the direction of an arrow D in FIG. 15 about a transfer medium conveyor belt driving shaft 348C (as a fulcrum) so as to prevent the drums and transfer medium conveyor belt from being damaged by rotation of the vibration wave motors, and the transfer medium conveyor belt is moved to the D side in the measurement mode.

When a drum calculation control portion 412 shown in FIG. 18 sets the measurement mode, the characteristics of the vibration wave motors begin to be measured in the flow shown in FIG. 16. The flow chart in FIG. 16 will be explained below also using FIG. 18.

The drum and transfer medium conveyor belt motors and other motors (not shown: e.g., a motor for driving rollers that pick up paper sheets from the cassettes, a motor for driving a fixing belt, and the like) are started up. In the flow, the vibration wave motor control portion will be explained.

1-1: Driving frequency A of each vibration wave motor is set in an initial frequency register R of a lowest control value setting portion in a driving frequency control portion 404. The driving frequency control portion generates a frequency corresponding to the initial frequency register value using a driving frequency generation portion 406.

1-2: A driving pulse generation portion 410 sets the pulse width of driving pulses output at the frequency set in step 1-1.

1-3: A step a upon measuring the characteristics of each vibration wave motor is set, and the driving frequency is varied by the step a. In order to start up a vibration wave motor, the motor must be driven from a frequency which is higher than the resonance point (e.g., a point A in the characteristics shown in FIG. 17) and is equal to or higher than the stop frequency. In this embodiment, frequency A required for driving the motor is set.

1-4: Normally, in order to rotate the motor at a predetermined rotational speed, the driving frequency control portion controls the driving frequency based on a signal output from a speed detection means (rotary encoder in this embodiment) coaxially attached to the vibration wave motor, so as to rotate the motor at a target speed. In this measurement mode, startup operation for rotating the vibration wave motor is made, and when the driving frequency is gradually lowered, the vibration wave motor begins to be started up, and its rotational speed gradually increases and reaches a maximum speed at the resonance point.

When the driving frequency is further lowered from that driving frequency, the speed of the vibration wave motor decreases abruptly, and the motor stops. The objective of this measurement mode is to obtain this value (frequency) C, and the driving frequency control portion is set in a manual mode to start driving.

1-5: Speed data is sampled (the output from the encoder is input to a calculation control portion 412 to obtain speed data).

1-6: It is checked if rotation has stabilized. The rotation start driving frequency varies depending on characteristics unique to each vibration wave motor, and rotation at low speed is highly likely to be unstable. For this reason, in this step, the rotational speed is detected, and it is checked if the motor is rotating. Since rotation need only be detected, a value smaller than the frequency that can rotate the vibration wave motor may be set as a comparison value, and it may be checked if that value has been reached.

If the current speed is equal to or lower than a stable (or predetermined) speed, the change step α is subtracted from the value of the initial frequency register R in step 1-7, and that difference is re-set in the initial frequency register R, thus gradually increasing the rotational speed of the vibration wave motor.

On the other hand, if it is determined that the rotational speed of the vibration wave motor has reached a stable (or predetermined) speed, that speed data is sampled in step 1-8 to detect in turn if the motor is stopped.

If the motor is still rotating, the value of the initial frequency register R is decremented by the frequency change step α in step 1-10, thus decreasing the driving frequency by the step α. In this manner, the driving frequency of the vibration wave motor gradually approaches the resonance frequency fc, and finally reaches it. If the driving frequency is further lowered, the rotational speed lowers abruptly, and the motor stops. If it is determined in step 1-9 that the motor has stopped, the value of the initial frequency register R when the motor stopped, i.e., the resonance frequency at the stop timing is stored as C in step 1-11. In step 1-12, the driving pulses are stopped to stop driving of the vibration wave motor, thus ending the measurement mode. This measurement mode is executed for each of the individual motors.

A description for FIG. 18 will be supplemented. Since this embodiment uses five vibration wave motors, there are five sets of vibration motors, rotary encoders, driving frequency control portions 404, and AC voltage generation portions 411. Each rotary encoder is coaxially coupled to the corresponding vibration wave motor, and a speed signal is output from the rotary encoder in correspondence with the rotation of that vibration wave motor. The speed signal is compared with the target value by a speed (signal) difference detector 403 to obtain their difference, and that speed difference signal is input to a driving frequency detection portion 405. The driving frequency detection portion 405 calculates the driving frequency so as to decrease it when the speed is to be increased with respect to the current driving frequency, or to increase the driving frequency when the speed is to be decreased. The calculated driving frequency is input to a control manner changing portion 407 as the detected driving frequency.

The control manner changing portion 407 selects one of the detected driving frequency and the frequency set by the calculation control portion 412 (the processes in the measurement mode shown in FIG. 16), the driving frequency generation portion 406 generates a driving frequency, and the driving pulse generation portion 410 generates pulses to be actually supplied to the vibration wave motor. After that, the pulses are amplified by the AC voltage generation portion 411, thus driving the vibration wave motor.

Figure 19B:
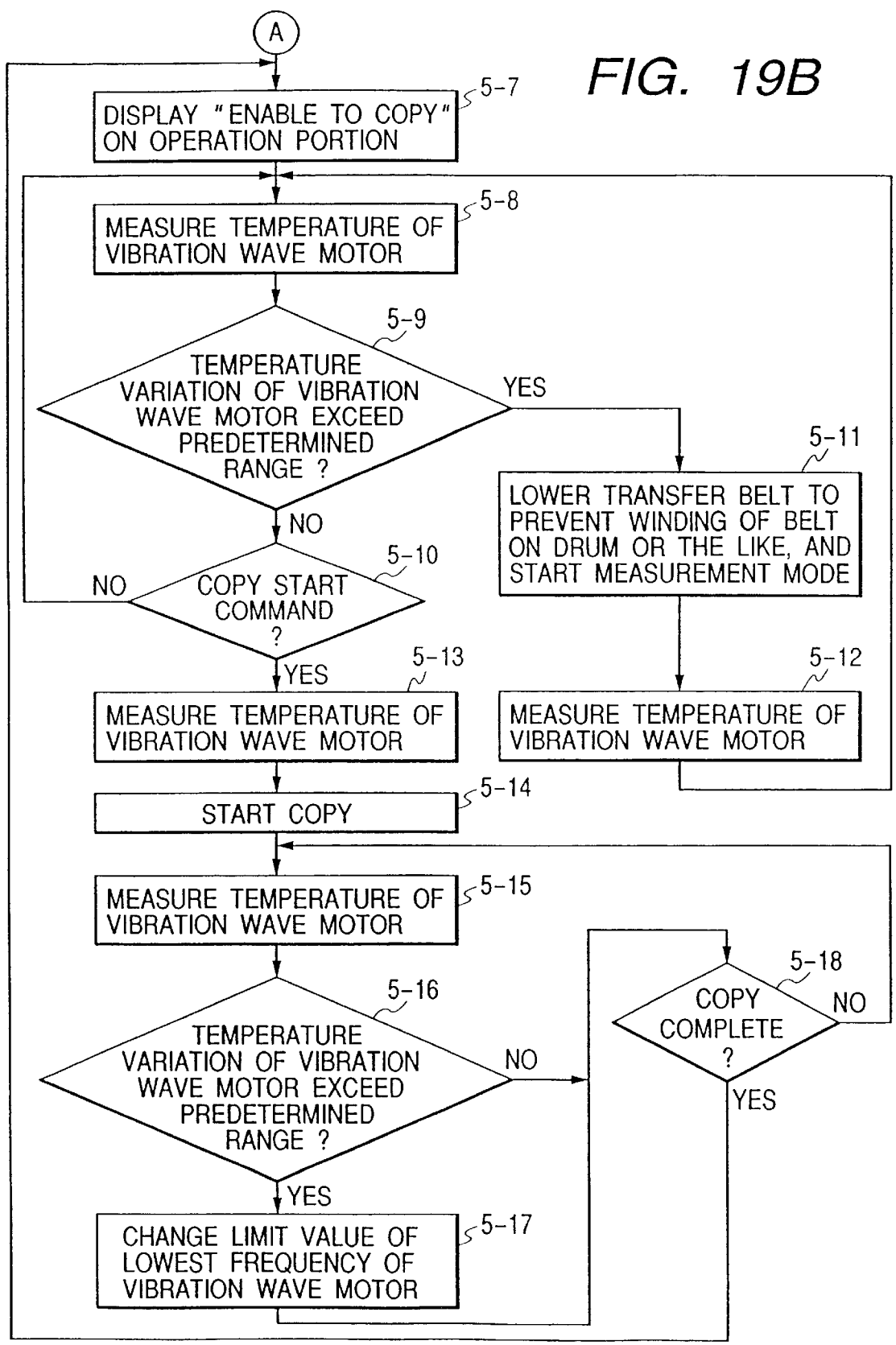
FIG. 19, composed of FIGS. 19A and 19B, is a flow chart showing the copy operation of the fifth embodiment.

FIGS. 19A and 19B show the operation flow of the actual apparatus to explain the limitation method upon executing the measurement mode and speed control of the vibration wave motors in the actual apparatus.

If the power supply of the apparatus is turned on in step 5-1, the apparatus starts preparation operation in step 5-2. In the preparation operation of this embodiment, a heater of a fixing device 334 for thermally fixing toner, which has been transferred onto a paper sheet, on the paper sheet is energized to warm up the fixing device to a predetermined temperature, and respective screws in the developer containers are rotated by a predetermined amount to make toner in the developer containers ready to develop an image.

Figure 20:
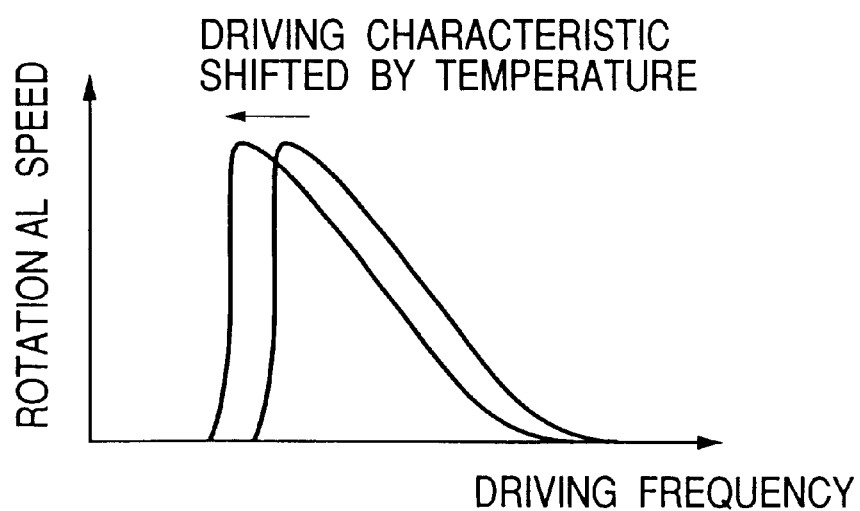
FIG. 20 is a graph showing the resonance frequency of a vibration wave motor, which shifts upon temperature shift.

The current temperatures of the individual vibration wave motors are measured in step 5-3. When the temperature rises, the operation characteristics of the vibration wave motor shift in the direction of an arrow, as shown in FIG. 20. For this reason, in the measurement mode of each vibration wave motor, the temperature at that time must be known.

In this embodiment, temperature sensors are provided for each of the individual drums and roller. In place of these temperature sensors, a thermistor 414 may be attached to the surface of each motor to enable measurement of the temperature of each motor. If five motors make identical rotation operations, the temperature can be predicted from one motor or the ambient temperature. The calculation control portion 40 can obtain the motor temperature based on the value of this thermistor 414. The following explanation will be given on the condition that the temperature is measured while sensors (thermistors) are attached to the individual motors.

Assume that temperatures measured at that time are $T_{11}$ to $T_{15}$ (the temperatures of the five motors).

Since the drums and conveyor belt are operated in the measurement mode in step 5-4, the conveyor belt is moved downward to prevent the drums and the like from being damaged by the speed difference, and the measurement mode shown in FIG. 16 is executed (to obtain resonance frequencies "lowest frequencies" $F_s11$ to $F_s15$ when the motors are stopped).

5-5: The temperatures of the individual vibration wave motors upon completion of the measurement mode are measured. Assume that the temperatures at that time are $T_{21}$ to $T_{25}$. Also, sets of $T_{11}$ to $T_{15}$, $F_s11$ to $F_s15$, and $T_{21}$ to $T_{25}$ are recorded in a table.

In fact, when a vibration wave motor is rotated from a cold state, its temperature rises abruptly, and then increases gradually. For this reason, the temperature difference between the temperatures before and after the measurement mode can be clearly detected.

5-6: The transfer belt is returned, and the motors are started up (the driving frequency is gradually lowered from the initial value to increase the speed up to the target speed) to perform the startup process of the apparatus. It is then checked if the startup process is complete, i.e., if the target speed has been reached. If the startup process is complete, a message "enable to copy" or "enable to print" is displayed on an operation portion in step 5-7.

5-8: The temperatures of the vibration wave motors are measured to obtain values $T_{31}$ to $T_{35}$.

5-9: If the temperature of at least one of the motors has risen from the initially measured motor temperatures $T_{11}$ to $T_{15}$ by a prescribed temperature (e.g., 10 deg; which is merely an example, and must be adjusted in correspondence with the characteristics of the vibration wave motors), the transfer medium conveyor belt is moved downward in step 5-11 to prevent the drums and the like from being damaged, so as to measure the characteristics of the vibration wave motors again in the measurement mode of the vibration wave motors, and the measurement mode is executed. The lowest frequency values obtained in the measurement mode are stored.

In step 5-12, temperatures $T_{41}$ to $T_{45}$ of the individual motors upon completion of the measurement mode are measured.

Since the temperatures $T_{31}$ to $T_{35}$ have risen from the temperature $T_{11}$ to $T_{15}$ by around 10 deg, lowest frequency values fs21 to fs25 obtained at that time are stored.

Also, the temperatures $T_{41}$ to $T_{45}$ at that time are stored. Since this mode is started when the temperature of the main body has further risen by 10 deg, data are stored in a table shown in FIG. 21 to prevent the data from being erased.

5-12: Upon completion of measurement, the flow returns to step 5-8 again, and the control normally waits for a copy (or print) start command in step 5-10.

In this state, the flow does not advance to step 5-13 until a copy start command is detected in step 5-10. While no copy start command is detected, the temperatures are repetitively measured in step 5-8. When the temperature measured in step 5-8 has changed from that previously measured in step 5-8 by the prescribed temperature of 10° C. or more, the measurement mode is executed in step 5-11 again, and a lowest frequency Fs21 at that time, temperature T31 in step 5-8, and temperature T41 in step 5-12 are recorded in the table. After that, before the copy start command is input, every time it is determined that the temperature measured in step 5-8 have changed from the temperature $T_{11}$ measured in step 5-3 by 10° C. or more, i.e., every time it is determined that the current temperature has changed from the previous temperature by 10° C. or more, the temperature at that time, the lowest frequency, and the temperature after the measurement mode are additionally recorded in the table. That is, when no copy start command is input for a long period of time, and temperature changes of 10° C. have frequently taken place with respect to the temperature measured in step 5-3, many temperatures and lowest frequencies at those temperatures are recorded in the table.

If a copy (or print) start command is input, print operation is started. The start command is input by operating an operation member (not shown). At this time, the vibration wave motors begin to be driven. In this case, the lowest frequency of the control at that time is used as a limit value, and a lowest frequency corresponding to the current temperature of each vibration wave motor is set. For example, if the temperature of the vibration wave motor is $T_{31}$, the lowest frequency Fs21 of the control is set.

Since there are five motors in this embodiment, the corresponding values are set for the individual motors. Since the vibration wave motors continue to rotate, their temperatures gradually rise due to an increase in ambient temperature and their own temperature rise. At this time, when the temperature change of each vibration wave motor has exceeded a prescribed value (10 deg in this embodiment), since the temperature has changed to T31', the lowest frequency of the control is changed to Fs21'.

In this manner, the setups are changed. More specifically, if a copy start command is input in step 5-10, the temperature at that time is measured in step 5-13, and the lowest frequency recorded in the table in correspondence with the measured temperature is set as a lower limit value to prevent the driving frequency from shifting to a frequency lower than the lower limit value. In the copy operation, steps 5-15 to 5-18 are repeated, and the temperature is repetitively measured in step 5-15. If the temperature measured in step 5-15 has changed from that in step 5-13 by 10° C. or more, the lowest frequency which is stored in the table and corresponds to a temperature closest to that measured in step 5-15 is set for each motor in step 5-17. After that, every time the temperature measured in step 5-15 has changed by 10° C., the lowest frequency corresponding to a temperature in the table closest to that measured in step 5-15 is read out and set.

At this time, if the table shown in FIG. 21 has already been prepared, the apparatus operates according to that table value. If a table with one set of contents is available, Fs11-a, i.e., a change amount a of the resonance frequency fc with respect to the average temperature of the vibration wave motor is defined in advance, and the lowest frequency Fs is set using this value, when a temperature change exceeding a prescribed amount has taken place.

In the main operation, the changing portion 407 performs control based on the frequency obtained by the driving frequency detection portion 405, and at that time, the driving frequency is controlled not to shift to a frequency lower than the lowest frequency. That is, in main operation, the current speed is obtained based on the output from each decoder, and the portion 405 obtains and sets the driving frequency in accordance with the difference between the current and target speeds so as to shift the current speed to the target speed. In this case, the driving frequency is controlled so as not to assume a value lower than the lowest frequency.

With this control, the control can be made within the current maximum control range of each vibration wave motor, and maximum control can be achieved. In addition, upon control, a control frequency below the uncontrollable resonance frequency fc can be prevented from being set, and the vibration wave motor can be prevented from stalling by a control frequency below the resonance frequency fc.

Sixth Embodiment

Figure 22B:
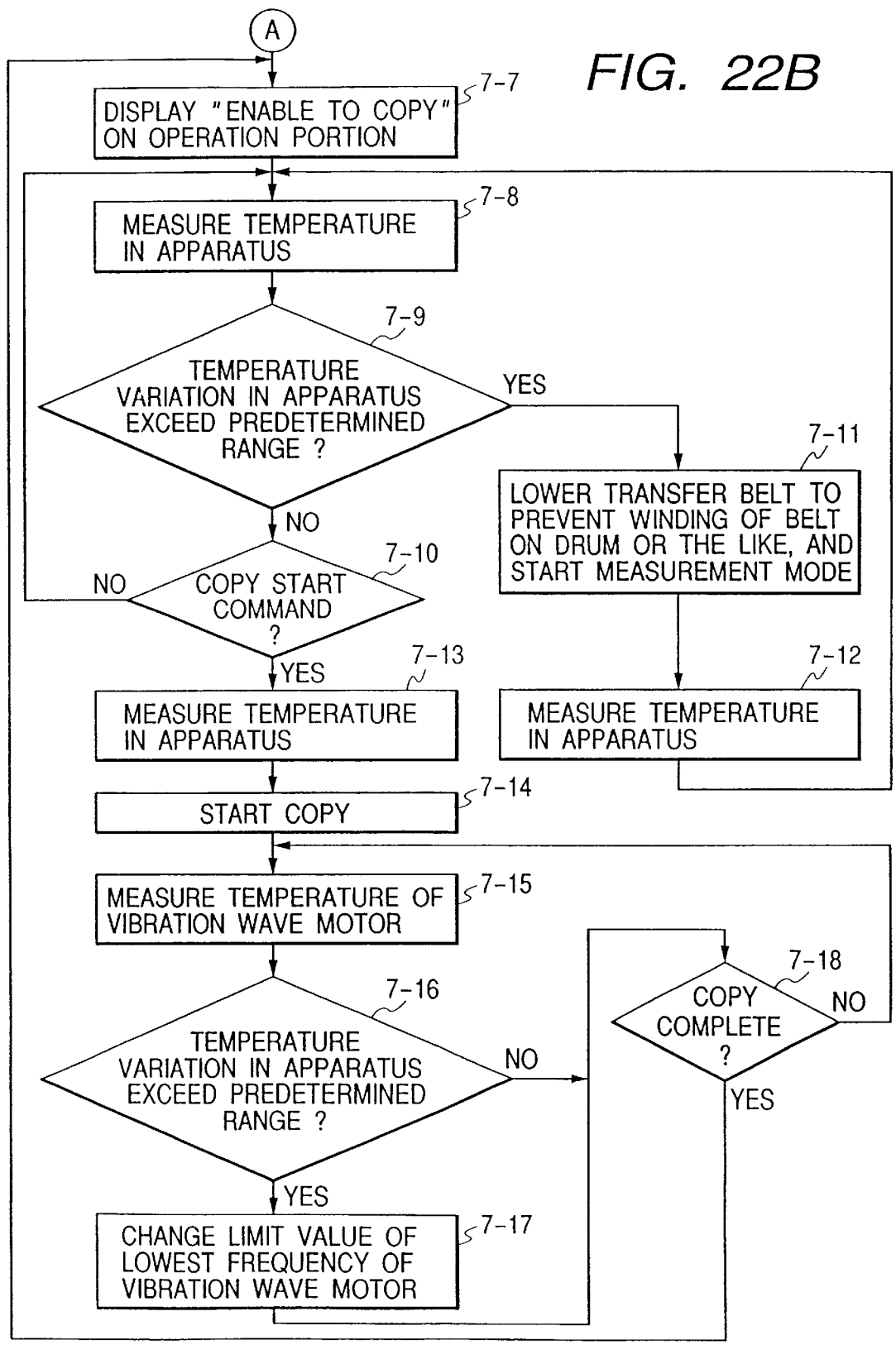
FIG. 22, composed of FIGS. 22A and 22B, is a flow chart showing the copy operation of the sixth embodiment.
Figure 23:
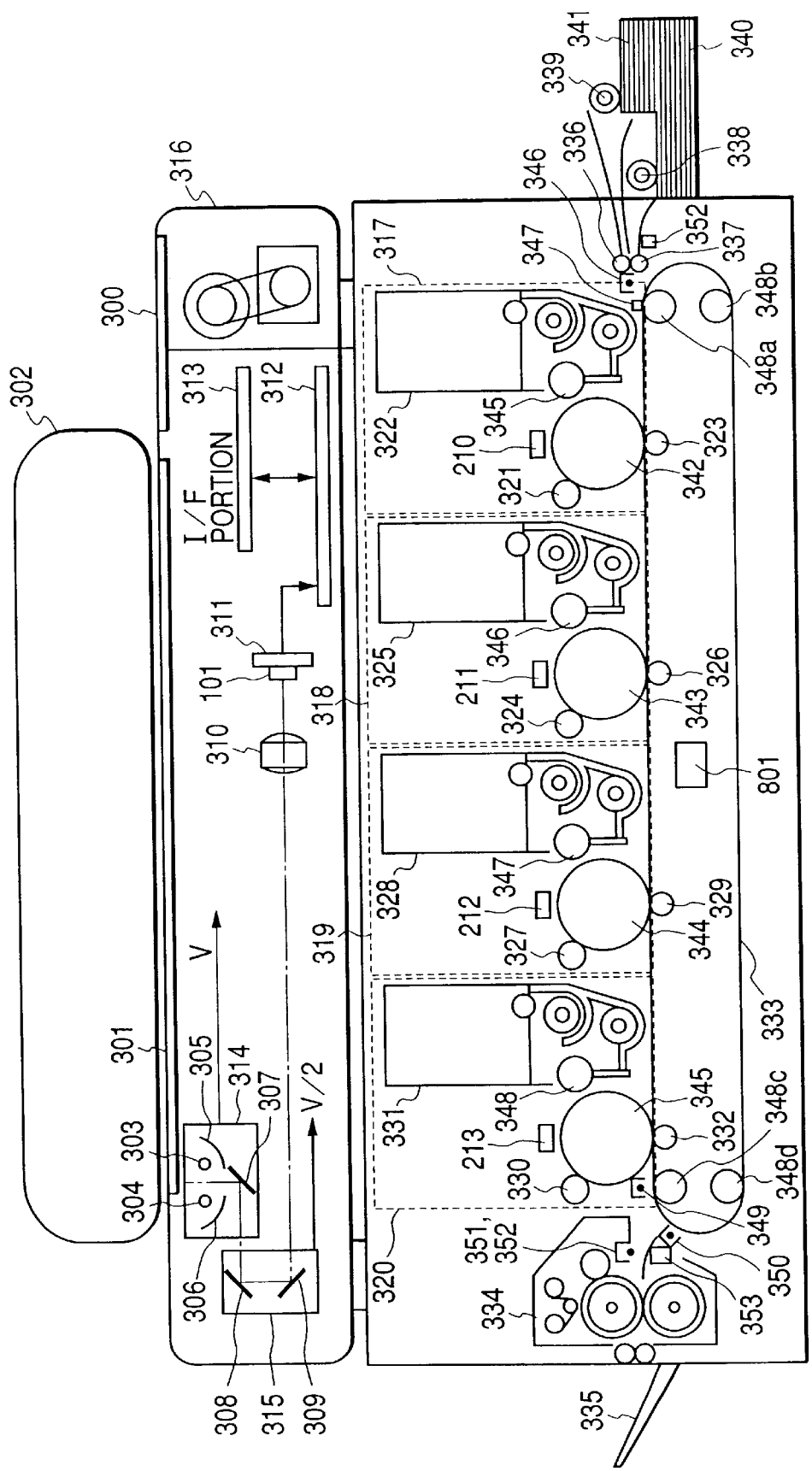
FIG. 23 is a schematic sectional view of an image forming apparatus in the sixth embodiment.

FIGS. 22A, 22B and 23 show the sixth embodiment.

In the fifth embodiment described above, the temperature of each vibration wave motor is directly measured. Since temperature rise of each vibration wave motor is associated with the ambient temperature in the apparatus and the rotation time of the vibration wave motor, this embodiment predicts the temperature of each vibration wave motor, and defines the lowest frequency at that time.

As shown in FIG. 23, an image forming apparatus has a thermometer 801 for detecting temperature in the apparatus.

For this reason, in the temperature distribution in the apparatus, the temperature near a fixing device 334 tends to gradually increase from the temperature measured upon turning on the power supply as the fixing device warms up, and the temperature drops with increasing distance from the fixing device.

FIGS. 22A and 22B are flow charts showing the operation of this embodiment, and the processing will be briefly explained below.

7-1: The power supply of the apparatus is turned on, and the apparatus enters preparation operation in step 7-2. In the preparation operation of this embodiment, a heater of the fixing device 334 for thermally fixing toner, which has been transferred onto a paper sheet, on the paper sheet is energized to warm up the fixing device to a predetermined temperature, and respective screws in the developer containers are rotated by a predetermined amount to make toner in the developer containers ready to develop an image.

7-3: The current temperature in the apparatus is measured by the thermometer 801, which is set at nearly the central position (nearly the central position of the image forming apparatus) of a transfer medium conveyor belt 333. Assume that the temperature at that time is $T_{a1}$.

To operate the drums and conveyor belt in the measurement mode in step 7-4, the conveyor belt is moved downward to prevent the drums and the like from being damaged by any speed difference, and the measurement mode shown in FIG. 16 is executed.

7-5: The temperature upon completion of the measurement mode is measured. Assume that the temperature at that time is $T_{a2}$. In practice, when the vibration wave motor is rotated from a cold state, its temperature rises abruptly, and then increases gradually. For this reason, the temperature difference between the temperatures before and after the measurement mode can be clearly detected.

7-6: It is checked if the startup process of the apparatus is complete. If the startup process is complete, a message "enable to copy" or "enable to print" is displayed on an operation portion in step 7-7.

7-8: The temperature is measured to obtain a value $T_{a3}$.

7-9: If the temperature has risen from the initially measured temperature $T_{a1}$ by a prescribed temperature (e.g., 10 deg; which is merely an example, and must be adjusted in correspondence with the characteristics of the vibration wave motors), the transfer medium conveyor belt is moved downward in step 7-11 to prevent the drums and the like from being damaged, so as to measure the characteristics of the vibration wave motors again in the measurement mode of the vibration wave motors, and the measurement mode is executed. Then, the lowest frequency value obtained in the measurement mode is stored.

In step 7-12, a temperature $T_{a4}$ at the end of the measurement mode is obtained. At this time, the apparatus stores the temperature $T_{a1}$, and stops driving frequencies fs11 to fs15 of the individual vibration wave motors obtained in the measurement mode. Also, the apparatus stores a temperature $T_{a2}$ upon completion of the measurement as associated data.

Next, when a temperature $T_{a3}$ has risen from the temperature $T_{a1}$ by around 10 deg, lowest frequency values fs21 to fs25 obtained at that time are stored. Also, a temperature $Ta_4$ at that time is stored. Since this mode is started when the temperature of the image forming apparatus main body has further risen by 10 deg, data are stored in a table shown in FIG. 24 to prevent the data from being erased.

7-12: Upon completion of measurement, the flow returns to step 7-8 again, and the control normally waits for a copy or print start command in step 7-10. Since steps 7-8 to 7-12 are repeated before the print start command is input, every time the temperature has risen from the previous temperature by about 10° C. or more, the measurement mode is executed, and the temperature and lowest frequencies at that time are stored, as in the fifth embodiment.

If a copy or print start command is input, print operation is started.

At this time, the vibration wave motors begin to be driven in step 7-14, and the limit values of the lowest frequencies of the control at that time are set to be those corresponding to the current temperatures of the vibration wave motors obtained in step 7-13. For example, if the temperature of each vibration wave motor is $T_{a3}$, the lowest frequency Fs21 of control is set. Since there are five motors in this embodiment, the corresponding values are set for the individual motors.

Since the vibration wave motors continue to rotate, their temperatures gradually rise due to an increase in ambient temperature and their own temperature rise. At this time, when the temperature change of each vibration wave motor has exceeded a prescribed value (10 deg in this embodiment), since the temperature has changed to $T_{a3}'$, the lowest frequency of the control is changed to Fs21'. In this manner, the setups are changed. At this time, if the table shown in FIG. 24 has already been prepared, the apparatus operates according to that table value. If a table with one set of contents is available, Fs11-a, i.e., a change amount a of the resonance frequency fc with respect to the average temperature of the vibration wave motor is defined in advance, and the lowest frequency Fs is set using this value, when a temperature change exceeding a prescribed amount has taken place. That is, if a change beyond 10° C. has been detected in steps 7-15 and 7-16, Fs11-a is calculated from the change amount a corresponding to the temperature at that time on the basis of the temperature obtained in steps 7-3 and 7-4 and the lowest frequency, and the calculated value is set to be a new lowest frequency.

With this control, the control can be made within the current maximum control range of each vibration wave motor, and maximum control can be achieved. In addition, upon control, a control frequency below the uncontrollable resonance frequency fc can be prevented from being set, and the vibration wave motor can be prevented from stalling by a control frequency below the resonance frequency fc.

In the measurement mode in the fifth embodiment, when the temperature change of each vibration wave motor has exceeded a prescribed value, the measurement mode may be started for each motor. Also, the result of the measurement mode may be stored in a memory which can be backed up, and one of the measurement mode (or a re-measurement mode; in which new data is created after power-on even when backup data are available), and a backup data use mode may be selected. In the backup data use mode, the measurement mode may be executed only when temperature-lowest driving frequency data are not available.

In the sixth embodiment, when temperature-lowest driving frequency data are not available and when the current lowest driving frequency data is Fs11, if the lowest frequency after the temperature rise is changed to Fs11-a, one curve can be selected for a from the following characteristics curves (1) and (2):

(1) linear with respect to temperature
(2) nonlinear with respect to temperature These curves are backed up, and representative data of the lowest frequency of each vibration wave motor with respect to temperature is stored. The backup correction curves can be corrected by the measurement result.

When the photosensitive drums are driven in the measurement mode upon power-on, and when a process initial mode requires photosensitive drum rotations, the measurement mode and process initial mode are combined, the measurement mode is held for the time required for the process initial mode so as to rotate the drums for a predetermined period of time, and after that, the measurement mode is restarted from that state until it ends.

What is claimed is:

1. A drive device for a vibration type motor, the vibration type motor including a vibration member and an electro-mechanical energy conversion element portion, said drive device generating a driving force in the vibration type motor by applying a periodic signal to the electro-mechanical energy conversion element portion, said drive device comprising:

drive circuitry that generates a periodic signal having a driving frequency;

detection circuitry that detects the driving frequency of the periodic signal;

limit value setting circuitry which sets a lower limit value of the driving frequency of the periodic signal in accordance with a change in the driving frequency of the periodic signal detected by said detection circuitry during a driving operation of the motor under a predetermined driving condition; and inhibition circuitry which inhibits the driving frequency of the periodic signal from shifting in a direction to become lower than the lower limit value set by said limit value setting circuitry during a driving operation of the motor.

2. A device according to claim 1, wherein said limit value setting circuitry sets an upper limit value of the driving frequency of the periodic signal in accordance with the change in the driving frequency of the periodic signal detected by said detecting circuitry during the driving operation of the motor, together with the lower limit value, and said inhibition circuitry inhibits the driving frequency of the periodic signal from shifting in a direction to become higher than the upper limit value set by said limit value setting circuitry during a driving operation of the motor.

3. A device according to claim 1, wherein the predetermined driving condition is a speed control state in which a driving speed of the motor is monitored, and the periodic signal is adjusted so that the monitored speed reaches a specific speed.

4. A device according to claim 1, wherein the lower limit value corresponds to a minimum value when the frequency varies.

5. A device according to claim 4, wherein the lower limit value corresponds to an average of minimum values of respective fluctuations of the driving frequency for a predetermined period.

6. A device according to claim 1, wherein the lower limit value corresponds to an average of minimum values of respective fluctuations of the driving frequency for a predetermined period.

7. A device according to claim 1, further comprising calculation circuitry, responsive to an output of said detection circuitry, which detects the change in the driving frequency of the periodic signal during the driving operation of the motor, and calculates the lower limit value.

8. A device according to claim 7, wherein said calculation circuitry does not calculate the lower limit value during a startup operation of the motor.

9. A device according to claim 7, wherein said calculation circuitry calculates the lower limit value during a predetermined period of time after completion of a startup process of the motor.

10. A drive device for a vibration type motor, the vibration type motor including a vibration member and an electromechanical energy conversion element portion, said drive device generating a driving force in the vibration type motor by applying a periodic signal to the electro-mechanical energy conversion element portion, said drive device comprising:

drive circuitry that generates a periodic signal having a driving frequency;

a temperature sensor;

measurement circuitry which measures a lower limit value of the driving frequency of the periodic signal for each temperature detected by said temperature sensor;

setting circuitry which sets the lower limit value corresponding to a temperature detected by the temperature sensor on the basis of a measurement result of said measurement circuitry; and inhibition circuitry which inhibits the driving frequency of the periodic signal from shifting to a frequency lower than the lower limit value set by said setting circuitry during a driving operation of the motor.

11. A device according to claim 10, wherein every time the temperature sensor detects the temperature has changed by not less than a predetermined amount, said measurement circuitry measures a lower limit value at a current temperature, and retains lower limit values corresponding to a plurality of temperatures as measurement results, and said setting circuitry sets the lower limit value at a predetermined one of the lower limit values corresponding to the plurality of temperatures every time the temperature has changed by not less than the predetermined temperature.

12. A drive device for a vibration type motor, the vibration type motor including a vibration member and an electro-mechanical energy conversion element portion, said drive device generating a driving force in the vibration type motor by applying a periodic signal to the electro-mechanical energy conversion element portion, said drive device comprising:

drive circuitry that generates a periodic signal having a driving frequency;

storage circuitry which stores lower limit values of the driving frequency corresponding to a plurality of different temperatures;

a temperature sensor;

setting circuitry which sets a lower limit value of the driving frequency of the periodic signal corresponding to a temperature detected by said temperature sensor on the basis of the lower limit values stored in said storage circuitry; and inhibition circuitry which inhibits the driving frequency of the periodic signal from shifting to a frequency lower than the lower limit value set by said setting circuitry during a driving operation of the motor.

13. A device according to claim 12, wherein every time a temperature has changed by not less than a predetermined amount to a new temperature, said setting circuitry sets a lower limit value corresponding to the new temperature.

14. A device according to claim 12, further comprising:

measurement circuitry which detects a driving state of the motor at the temperature detected by said temperature sensor, and measures the lower limit value corresponding to the detected temperature, and wherein a measurement result of said measurement circuitry is stored in said storage circuitry.

\* \* \* \* \*

UNITED STATES PATENT AND TRADEMARK OFFICE
CERTIFICATE OF CORRECTION

PATENT NO.   : 6,411,008 B1
DATED        : June 25, 2002
INVENTOR(S)  : Toshihiko Otsubo et al.

It is certified that error appears in the above-identified patent and that said Letters Patent is hereby corrected as shown below:

Title page,
Item [30], Foreign Application Priority Data, "Sep. 11, 1919 (JP) .... 10-258533" should read -- Sep. 11, 1998 (JP) .... 10-258533 --.

Column 4,
Line 3, "is" should be deleted.
Line 9, "1C ," should read -- 1C, --.

Column 5,
Line 55, "2B" should read -- 3B --.

Column 6,
Line 49, "rep resents" should read -- represents --.

Column 10,
Line 66, "αsp" should read -- βsp --.

Column 13,
Line 58, "step a" should read -- step α --.
Line 60, "step a." should read -- step α. --.

Column 14,
Line 31, "re-set" should read -- reset --.

Column 16,
Line 45, "have" should read -- has --.

Signed and Sealed this

Fourteenth Day of January, 2003

JAMES E. ROGAN
*Director of the United States Patent and Trademark Office*